(12) United States Patent
Saeki et al.

(10) Patent No.: US 8,272,966 B2
(45) Date of Patent: Sep. 25, 2012

(54) DAMPER DEVICE

(75) Inventors: Tomohiro Saeki, Anjo (JP); Makoto Takeuchi, Obu (JP); Hiroaki Suezaki, Anjo (JP); Yoshitaka Inoshita, Kariya (JP); Atsushi Yamazumi, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 416 days.

(21) Appl. No.: 12/535,321

(22) Filed: Aug. 4, 2009

(65) Prior Publication Data

US 2010/0062864 A1 Mar. 11, 2010

(30) Foreign Application Priority Data

Sep. 10, 2008 (JP) ................................. 2008-231919

(51) Int. Cl.
*F16D 7/02* (2006.01)
(52) U.S. Cl. ......................................................... 464/46
(58) Field of Classification Search ................ 464/45–49
See application file for complete search history.

(56) References Cited

U.S. PATENT DOCUMENTS

| 6,976,920 B2 * | 12/2005 | Suzuki et al. ................... 464/46 |
| 2007/0191118 A1 | 8/2007 | Saeki et al. |
| 2010/0032259 A1 | 2/2010 | Saeki et al. |
| 2010/0051411 A1 | 3/2010 | Saeki et al. |

FOREIGN PATENT DOCUMENTS

JP 2007-218346 A 8/2007

OTHER PUBLICATIONS

U.S. Appl. No. 12/476,774, filed Jun. 2, 2009, entitled "Torque Fluctuation Absorbing Apparatus" naming Satoshi Nakagaito, Tomohiro Saeki, Tsutomu Sekine and Yoshitaka Inoshita as inventors.

* cited by examiner

*Primary Examiner* — Gregory Binda
(74) *Attorney, Agent, or Firm* — Buchanan Ingersoll & Rooney PC

(57) ABSTRACT

A damper device includes a damper portion and a limiter portion, and the limiter portion has a first constitutive member formed to cover the damper portion or the limiter portion, a first and second friction materials fixed to a second constitutive member of the damper portion, a cover plate provided so as to be slidable to the first friction material, a support plate arranged so as to be distant from the cover plate at a radially inner portion of the support plate and so as to contact the cover plate at a radially outer portion of the support plate, a pressure plate provided so as to be slidable to the second friction material and a coned disc spring provided between the support plate and the pressure plate, wherein the first constitutive member is at least one of the cover plate and the support plate.

8 Claims, 21 Drawing Sheets

F I G. 19
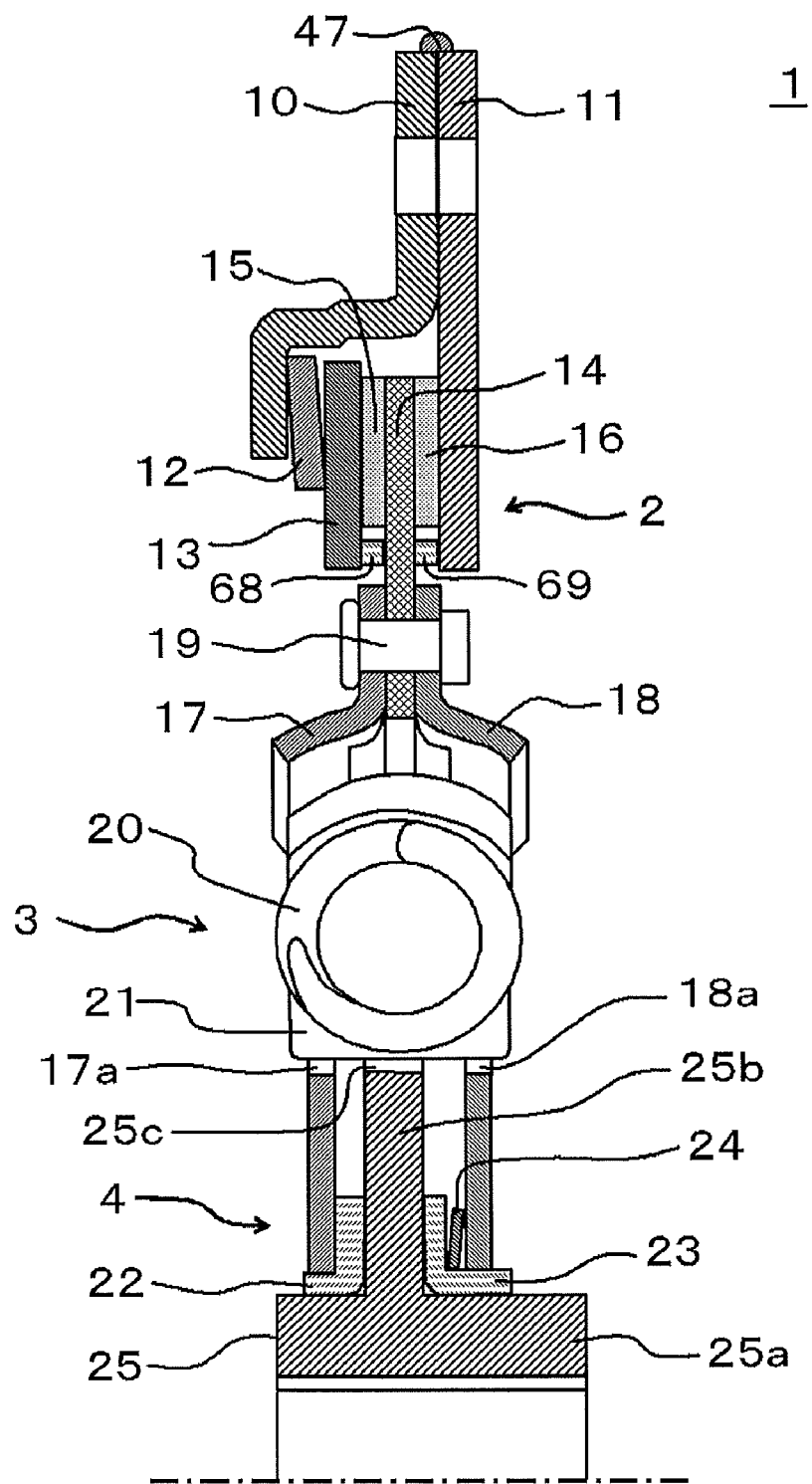

DAMPER DEVICE

CROSS REFERENCE TO RELATED APPLICATIONS

This application is based on and claims priority under 35 U.S.C. §119 to Japanese Patent Application 2008-231919, filed on Sep. 10, 2008, the entire content of which is incorporated herein by reference.

TECHNICAL FIELD

The disclosure relates to a damper device for absorbing a torque fluctuation generated between rotation shafts and having a waterproof structure.

BACKGROUND

A damper device is generally arranged at, for example a power transmission path between an engine and a clutch, in order to absorb a torque fluctuation generated between the engine and a transmission. The damper device generates a torsional force when the torque fluctuation is generated in order to absorb the torque fluctuation by means of elastic force of coil springs and friction force (hysteresis torque) generated by friction materials. In a case where water such as raindrops enters the transmission, and water and/or mud (dirt) enters the damper device, the friction material and a plate (a plate sliding together with the friction material) may rust at surfaces contacting each other. If the friction material and the plate rust, characteristics thereof are changed, and expected functions may not be obtained. Therefore, the known damper device (torque fluctuation absorber) is structured in such a way that an entire surface of the plate facing the transmission is covered, at the same time, a cover member is provided so as to separate sliding surfaces on which the friction material contacts the sliding surface slide from the outside, as a result, foreign objects and water may not enter the damper device, and a level of change in a limit torque value with the passage of time may be reduced (JP2007-218346A).

However, according to the known damper device, an input shaft of a transmission is inserted into a hole (an inner circumference portion) of a cover member of the damper device, and the cover member is supported by the input shaft by means of a seal member or a bush, so that the cover member prevents the input shaft from being eccentric. Therefore, when the damper device is mounted, the damper device needs to be positioned in a manner where the hole of the cover member of the damper device is fit to the input shaft. If the position of the hole of the cover member is not fit to the input shaft, the position of the cover member needs to be adjusted once the input shaft is removed from the damper device.

A need thus exists for a damper device, which is not susceptible to the drawback mentioned above.

SUMMARY

According to an aspect of this disclosure, a damper device includes a damper portion for absorbing a torsion by use of an elastic force and a limiter portion generating a slide when the torsion is not absorbed by the damper portion, and the limiter portion has a first constitutive member formed so as to cover at least one of the damper portion and the limiter portion, a first friction material fixed to one surface of a second constitutive member of the damper portion, a second friction material fixed to the other surface of the second constitutive member of the damper portion, a cover plate provided so as to be slidable to the first friction material, a support plate arranged so as to be distant from the cover plate at a radially inner portion of the support plate and so as to contact the cover plate at a radially outer portion of the support plate, a pressure plate provided so as to be slidable to the second friction material and a coned disc spring provided between the support plate and the pressure plate in order to bias the pressure plate toward the second friction material, wherein the first constitutive member is at least one of the cover plate and the support plate.

According to another aspect of this disclosure, a damper device includes a damper portion for absorbing a torsion by use of an elastic force, a limiter portion generating a slide when the torsion is not absorbed by the damper portion and one or more cover members for covering at least one of the damper portion and the limiter portion and attached to one of the damper portion and the limiter portion.

According to further aspect of the disclosure, a damper device includes a damper portion for absorbing a torsion by use of an elastic force, a limiter portion generating a slide when the torsion is not absorbed by the damper portion and one of an intermediate member and an elastic body for covering a clearance formed so as to connect a sliding surface of the limiter portion to the outside of the damper device.

BRIEF DESCRIPTION OF THE DRAWINGS

The foregoing and additional features and characteristics of this disclosure will become more apparent from the following detailed description considered with the reference to the accompanying drawings, wherein:

FIG. 19 illustrates a partial cross-section schematically indicating a configuration of a damper device in a nineteenth embodiment;

DETAILED DESCRIPTION

Figure 1:
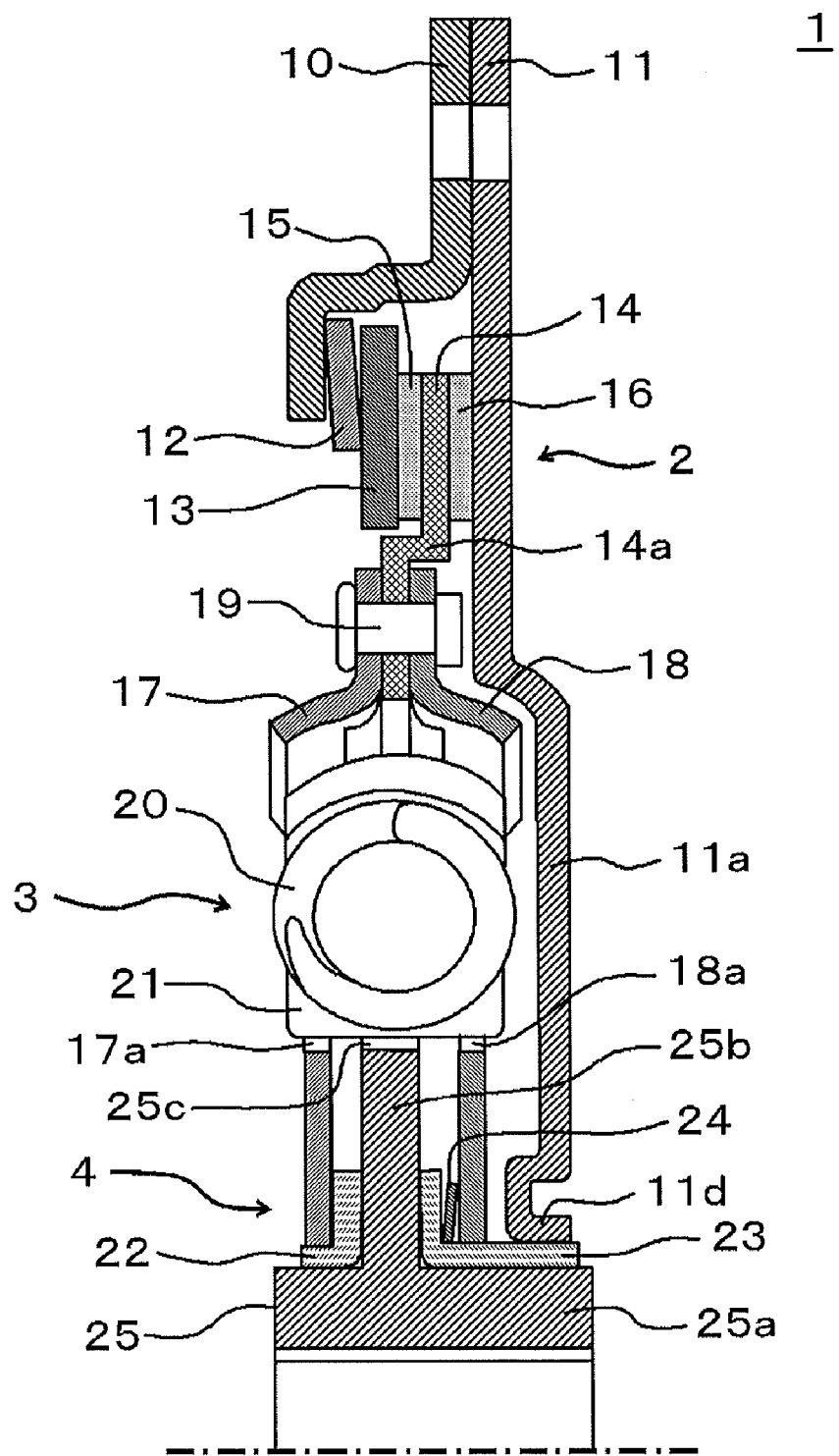
FIG. 1 illustrates a partial cross-section schematically indicating a configuration of a damper device in a first embodiment.

A damper device of a first embodiment will be explained with reference to drawings attached thereto. FIG. 1 illustrates a partial cross section schematically indicating a configuration of a damper device in the first embodiment.

The damper device 1 related to the embodiment 1 is provided, for example at a power transmission path between a rotational shaft of an engine and a rotational shaft of a transmission, and torque fluctuation, which is caused due to torsion of the rotation shafts of the engine and transmission, is absorbed (reduced) by means of the damper device 1. The damper device 1 having a function for absorbing the tensional force includes a damper portion 3 for absorbing the torque fluctuation by use of spring force, a hysteresis portion 4 for absorbing the torque fluctuation by use of hysteresis torque generated by friction and the like and a limiter portion 2 generating a slide when the torsion of the rotation shafts cannot be absorbed by the damper portion 3 and the hysteresis portion 4. The limiter portion 2 is arranged so as to be in series with the damper portion 3 and the hysteresis portion 4 at the power transmission path. The damper portion 3 is arranged so as to be in parallel with the hysteresis portion 4 at the power transmission path.

The damper device 1 is composed of a support plate 10 (e.g., a first constitutive member), a cover plate 11 (e.g., the first constitutive member), a coned disc spring 12, a pressure plate 13, a lining plate 14 (e.g., a second constitutive member), a friction materials 15 and 16 (e.g., a first friction material and a second friction material), a first side plate 17, a second side plate 18, a rivet 19, a coil spring 20, a seat members 21 (first and second seat members 21), a first thrust member 22 (e.g., an intermediate member), a second thrust member 23 (e.g., the intermediate member, a second intermediate member), a coned disc spring 24 (e.g., an elastic member) and a hub member 25.

Figure 20A:
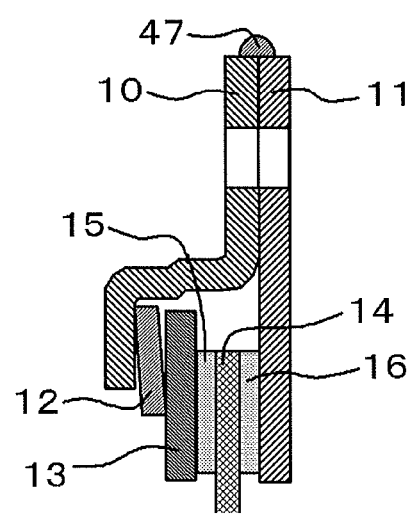
FIG. 20 illustrates partial cross sections schematically indicating four examples of sealing manner in a damper device of a twentieth embodiment.
Figure 20B:
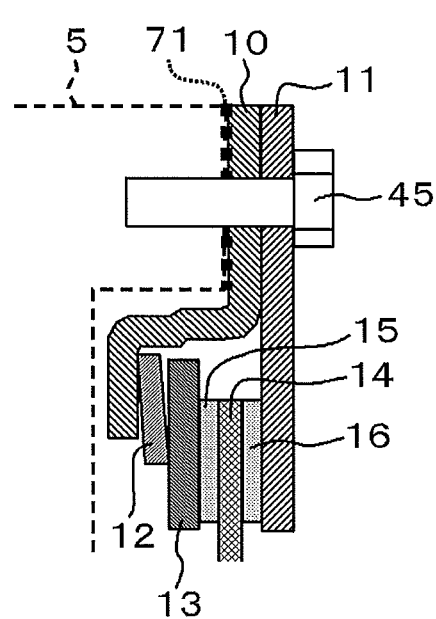

The support plate 10 is formed in an annular shape and is provided between a flywheel (corresponding to a dashed line indicated with a numeral "5" in FIG. 20B) and the cover plate 11 in an axial direction of the damper device 1, and the support plate 10 constitutes the limiter portion 2. The support plate 10 is fixed to the flywheel (corresponding to the dashed line indicated with the numeral "5" in FIG. 20B) together with the cover plate 11 at a radially outer portion thereof by means of a bolt (corresponding to a member indicated by a numeral "45" in FIG. 20B). The support plate 10 is distant from the cover plate 11 at a radially inner portion thereof. The support plate 10 supports the pressure plate 13 so as not to be relatively rotatable and so as to be movable in an axial direction of the damper device. The support plate 10 is press-fitted to the coned disc spring 12.

The cover plate 11 is formed in a circular shape and is provided at the other surface at which the flywheel is not contacted (the right surface in FIG. 1), and the cover plate 11 constitutes the limiter portion 2. The cover plate 11 is also fixed to the flywheel (corresponding to the dashed line indicated with the numeral "5" in FIG. 20B) at a radially outer portion thereof together with the support plate 10 by means of the bolt (corresponding to the member indicated with a numeral "45" in FIG. 20B) at a radially outer portion thereof. The cover plate 11 is press-fitted to the friction material 16 so as to be slidable on a sliding surface of the friction material 16. The cover plate 11 covers not only the limiter portion 2 at the side of the transmission (the right side in FIG. 1), but also the damper portion 3 at the side of the transmission (the right side in FIG. 1). The cover plate 11 includes a radially inner portion 11a formed so as to extend at the radially inward portion of the damper relative to the limiter portion 2. The radially inner portion 11a is formed so as not to interfere with the damper portion 3. The radially inner portion 11a includes a drawing portion 11d (stepped portion) formed in the vicinity of an inner end portion of the radially inner portion 11a by means of press molding, and the cover plate 11 is supported at an inner circumferential surface of the drawing portion 11d by the hub member 25 (hub portion 25a) via the second thrust member 23 so as to be relatively rotatable.

The coned disc spring 12 is a spring formed in a plate shape and is provided between the support plate 10 and the pressure plate 13. The coned disc spring 12 constitutes the limiter portion 12. The coned disc spring 12 applies a biasing force to the pressure plate 13 toward the friction material 15.

The pressure plate 13 is formed in an annular shape and is provided between the coned disc spring 12 and the friction material 15. The pressure plate 13 constitutes the limiter portion 2. The pressure plate 13 is supported by the support plate 10 so as not to be relatively rotatable and so as to be movable in the axial direction of the damper device. The pressure plate 13 is biased by means of the coned disc spring 12 toward the friction material 15. The pressure plate 13 is press-fitted to the friction material 15 at a sliding surface thereof so as to be slidable.

The lining plate 14 is also formed in a circular shape and supports the friction materials 15 and 16 at a position between the cover plate 11 and the pressure plate 13. The lining plate 14 constitutes the limiter portion 2 and the damper portion 3. The lining plate 14 is sandwiched between the first side plate 17 and the second side plate 18 at a radially inner portion of the lining plate 14 and fixed by means of the rivet 19 together with the first side plate 17 and the second side plate 18. At an intermediate portion of the lining plate 14, a stepped portion 14a is formed so that the radially inner portion of the lining plate is further distant from the cover plate 11. The friction materials 15 and 16 are fixed to the radially outer portion of the lining plate 14 by means of a rivet or an adhesive agent. In the same way as a damper device in a fourth embodiment or the like, which will be described below, the stepped portion 14a may not be formed at the lining plate 14.

The friction material 15 constitutes the limiter portion 2 and is provided between the lining plate 14 and the pressure plate 13. The friction material 15 is fixed to the lining plate 14 by means of a rivet or an adhesive agent. The friction material 15 is press-fitted to the pressure plate 13 so as to be slidable.

The friction material 16 constitutes the limiter portion 2. The friction material 16 is provided between the lining plate 14 and the cover plate 11 and fixed to the lining plate 14 by means of a rivet or an adhesive agent. The friction material 16 is press-fitted to the cover plate 11 so as to be slidable.

The first side plate 17 is formed in a circular shape and is provided at the side of the engine relative to a flange portion 25b of the hub member 25 (the left side in FIG. 1). The first side plate 17 constitutes the damper portion 3 and the hysteresis portion 4. The first side plate 17 is fixed to the lining plate 14 and the second side plate 18 so as to be integral therewith by means of the rivet 19 in the vicinity of an outer end of a radially outer portion of the first side plate 17. The first side plate 17 includes a window portion 17a, and the coil spring 20 and the seat members 21 (the first and second seat members 21) are housed in the window portion 17a at a radially intermediate portion of the first side plate 17, which corresponds to the damper portion 3. Specifically, one end surface of the window portion 17a in a circumferential direction contacts the first seat member 21 so as to be detachable, and the other end surface of the window portion 17a in a circumferential direction contacts the second seat member 21 so as to be detachable. At the hysteresis portion 4 set to be further inward than the damper portion 3 in a radial direction of the damper device, the first side plate 17 contacts the first thrust member 22 so as to be slidable. The first side plate 17 is supported by the hub member 25 (a hub portion 25a) via the first thrust member 22 at an inner end of a radially inner portion of the first side plate 17 so as to be rotatable relative to the hub member 25.

The second side plate 18 is formed in a circular shape provided at the side of the transmission relative to the flange portion 25b of the hub member 25 (the right side in FIG. 1). The second side plate 18 constitutes the damper portion 3 and the hysteresis portion 4. The second side plate 18 is fixed to the lining plate 14 and the first side plate 17 so as to be integral therewith by means of the rivet 19 in the vicinity of an outer end of a radially outer portion of the first side plate 17. The second side plate 18 includes a window portion 18a, and the coil spring 20 and the seat members 21 (the first and second seat members 21) are housed in the window portion 18a at a radially intermediate portion of the second side plate 18, which corresponds to the damper portion 3. Specifically, one end surface of the window portion 18a in a circumferential direction contacts the first seat member 21 so as to be detachable, and the other end surface of the window portion 18a in a circumferential direction contacts the second seat member 21 so as to be detachable. At the hysteresis portion 4 set to be further inward than the damper portion 3 in the radial direction of the damper device, the second side plate 18 supports the coned disc spring 24. The second side plate 18 is supported by the hub member 25 (hub portion 25a) via the first thrust member 23 at an inner end of a radially inner portion of the second side plate 18 so as to be rotatable relative to the hub member 25.

The rivet 19 is used for fixing the lining plate 14, the first side plate 17 and the second side plate 18 so as to be integral.

The coil spring 20 constitutes the damper portion 3 and is housed in the window portions 17a, 18a and 25c. The window portion 17a is formed at the first side plate 17, the window portion 18a is formed at the second side plate 18 and the window portion 25c is formed at the hub member 25 (flange portion 25b). The coil spring 20 contacts the seat members 21 at each end of the coil spring 20. The coil spring 20 is compressed, when the first and second side plates 17 and 18 and the hub member 25 are rotated so as to be relative to each other, in order to absorb the relative rotation caused by the rotational differences between the first and second side plates 17 and 18 and the hub member 25. A straight-shaped spring, whose compressed direction extends in a straight line, or a straight-shaped bent spring, whose compressed direction extends in a straight line but being bent when being arranged, may be applied to the coil spring 20. An arc spring, whose compressed direction extends along the circumferential direction, may be applied to the coil spring 20 in order to absorb a greater amount of torsion torque.

The first and second seat members 21 constitute the damper portion 3 and are housed in the window portions 17a, 18a and 25c, the window portion 17a being formed at the first side plate 17, the window portion 18a being formed at the second side plate 18 and the window portion 25c being formed at the hub member 25 (flange portion 25b). The first seat member 21 is provided between one end surface of each of the window portions 17a, 18a and 25c and one end of the coil spring 20, and the second seat member 21 is provided between the other end surface of each of the window portions 17a, 18a and 25c and the other end of the coil spring 20. The seat member 21 is made of resin so that a level of a friction generated at the coil spring 20 may be reduced.

The first thrust member 22 constitutes the hysteresis portion 4 and is formed in an annular shape. The first thrust member 22 is provided between the first side plate 17 and the hub member 25. Specifically, the first thrust member 22 is positioned between the first side plate 17 and the flange portion 25b of the hub member 25 in the axial direction of the damper device and is press-fitted to the first side plate 17 and the flange portion 25b so as to be slidable. The first thrust member 22 is also positioned between the first side plate 17 and the hub portion 25a in a radial direction of the damper device so as to function as a plain bearing (bush) for supporting the first side plate 17 so as to be rotatable relative to the hub portion 25a.

The second thrust member 23 constitutes the hysteresis portion 4 and is formed in an annular shape. The second thrust member 23 is provided between the second side plate 18 and the hub member 25. Specifically, the second thrust member 23 is positioned between the coned disc spring 24 and the flange portion 25b in the axial direction of the damper device, and the second thrust member 23 is biased by means of the coned disc spring 24 toward the flange portion 25b and is press-fitted to the flange portion 25b so as to be slidable. The second thrust member 23 is also positioned between the second side plate 18 and the hub portion 25a and between the cover plate 11 and the hub portion 25a in a radial direction of the damper device. In this configuration, the second thrust member 23 functions as a plain bearing (bush) for supporting the second side plate 18 and the cover plate 11 so as to be rotatable relative to the hub portion 25a.

The coned disc spring 24 constitutes the hysteresis portion 4. The coned disc spring 24 is formed in a plate shape and positioned between the second thrust member 23 and the second side plate 18. In this configuration, the coned disc spring 24 applies a biasing force to the second thrust member 23 toward the flange portion 25b.

Torque transmitted via the damper portion 3 and the hysteresis portion 4 is outputted to the transmission by means of the hub member 25. The hub member 25 constitutes the damper portion 3 and the hysteresis portion 4. The hub member 25 also includes the flange portion 25b formed so as to extend from an outer circumferential surface of the hub portion 25a at a predetermined portion. A spline is formed on an inner circumferential surface of the hub portion 25a in order to be connected to the shaft of the transmission. The hub portion 25a supports the first side plate 17 so as to be relatively rotatable at the outer circumferential surface of the hub portion 25a via the first thrust member 22 and also supports the second side plate 18 and the cover plate 11 so as to be relatively rotatable at the outer circumference surface of the hub portion 25a via the second thrust member 23. The flange portion 25b includes the window portion 25c, and the coil spring 20 and the seat members 21 (the first and second seat members 21) are housed in the window portion 25c at a radially outer portion of the flange portion 25b, which corresponds to the damper portion 3. Specifically, one end surface of the window portion 25c in a circumferential direction contacts the first seat member 21 so as to be detachable, and the other end surface of the window portion 25c in a circumferential direction contacts the second seat member 21 so as to be detachable. The flange portion 25b is held between the thrust members 22 and 23 so as to be slidable at each surface of the flange portion 25b, the surfaces being arranged so as to correspond to the hysteresis portion 4 that is set at a radially inner portion of the damper device relative to the damper portion 3 and so as to face in the axial direction of the damper device.

Although the limiter portion 2 and the damper portion 3 are not covered by a component constituting the damper device 1 at the side of the engine (the left side in FIG. 1), the limiter portion 2 and the damper portion 3 may be covered by the flywheel (corresponding to the dashed line indicated by the numeral "5" in FIG. 20B) at the side of the engine. Specifically, the limiter portion 2 and the damper portion 3 at the side of the engine (the left side in FIG. 1) may be covered by attaching the flywheel (corresponding to the dashed line indicated with the numeral "5" in FIG. 20B) or the like to the support plate 10 at the side of the engine (the left side in FIG. 1).

According to the first embodiment, although foreign objects such as water may enter the damper device from outside through the damper portion 3 and the limiter portion 2 at the side of the transmission (the right side in FIG. 1), because the damper portion 3 and the limiter portion 2 are covered by means of the cover plate 11 at the side of the transmission (the right side in FIG. 1), a pathway through which the water enters the damper device may be blocked, as a result, possibility of decrease in performance due to rust or the like may be reduced. Further, because the damper portion 3 and the limiter portion 2 are covered by the cover plate 11 at the side of the transmission (the right side in FIG. 1), no additional covering member is needed, which may result in cost reduction. Furthermore, because the second thrust member 23 is positioned between the cover plate 11 and the hub member 25 (hub portion 25a), a possibility that the water enters the limiter portion 2 of the damper device 1 may be reduced, and also a possibility that the limiter portion 2 becomes eccentric from the hub may be reduced. Furthermore, because the drawing portion 11d (stepped portion) is formed at the cover plate 11 at a portion where the cover plate 11 contacts the second thrust member 23, the cover plate 11 may contact the second thrust member 23 at a relatively large area, accordingly the water proof function and the eccentricity preventing function may be improved.

A damper device of a second embodiment will be explained with reference to the drawings attached thereto.

Figure 2:
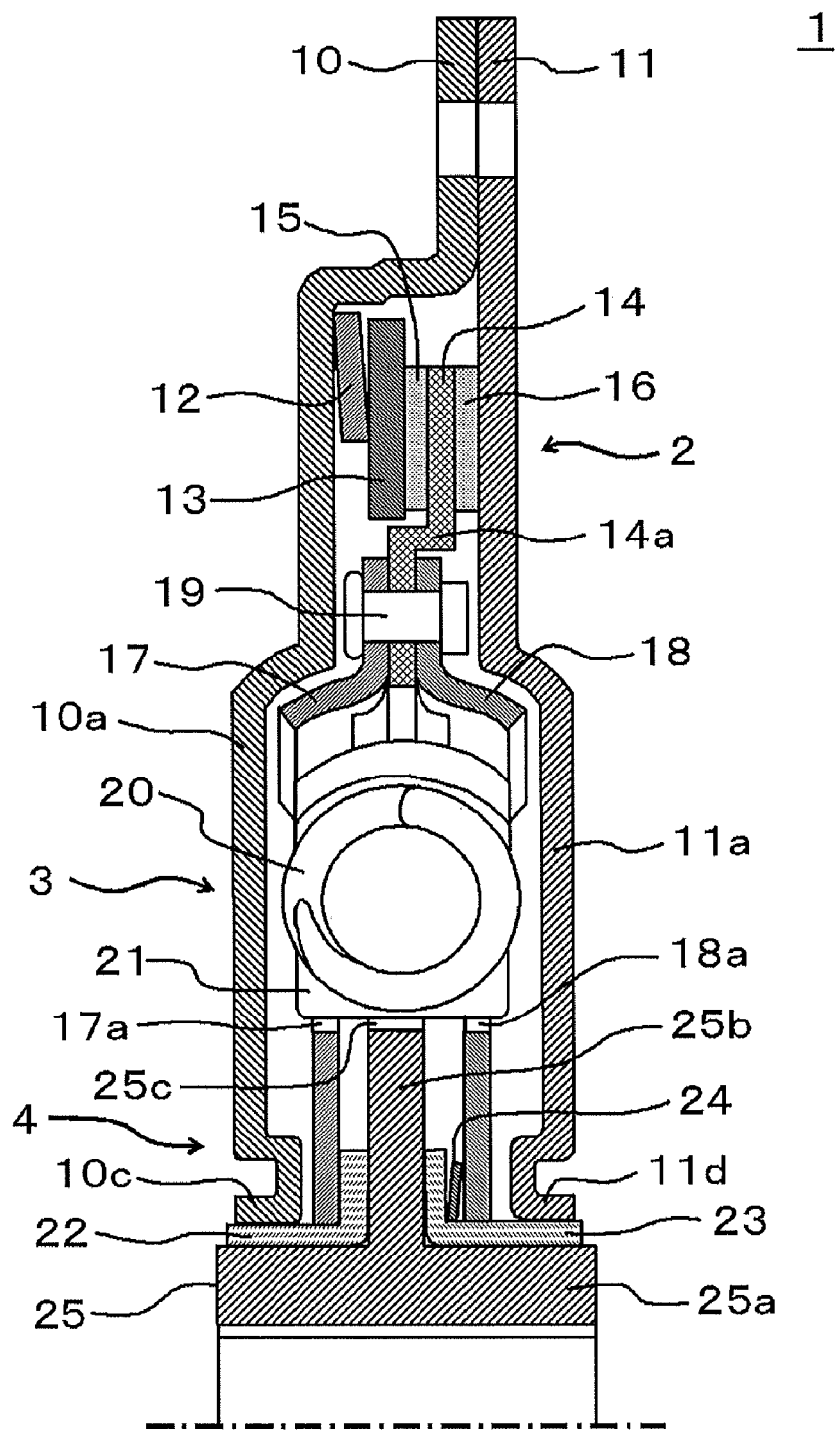
FIG. 2 illustrates a partial cross-section schematically indicating a configuration of a damper device in a second embodiment.

FIG. 2 illustrates a partial cross section schematically indicating a configuration of a damper device in the second embodiment.

According to the damper device in the first embodiment, the cover plate (indicated by the numeral 11 in FIG. 1) includes the radially inner portion 11a formed so as to extend at the radially inner portion of the damper device relative to the limiter portion (indicated by the numeral 2 in FIG. 2) in order to cover the damper portion 3 and the limiter portion 2 at the side of the transmission (the right side in FIG. 1). According to the damper device 1 in the second embodiment, the support plate 10 includes a radially inner portion 10a formed so as to extend at the radially inner portion relative to the limiter portion 2 in order to cover the damper portion 3 and the limiter portion 2 at the side of the engine (the left side in FIG. 2). Other configurations of the damper device in the second embodiment are substantially similar to that of the first embodiment.

The support plate 10 is structured to cover not only the limiter portion 2 at the side of the engine (left side in FIG. 2) but also the damper portion 3 at the side of the engine (left side in FIG. 2). Specifically, the support plate 10 includes the radially inner portion 10a formed so as to extend at the radially inner portion of the damper device relative to the limiter portion 2. More specifically, the radially inner portion 10a is formed so as not to interfere with the damper portion 3. Further, the radially inner portion 10a includes a drawing portion 10c (a stepped portion) formed in the vicinity of an inner end portion of the radially inner portion 10a by means of press molding. The support plate 10 is supported at an inner circumferential surface of the drawing portion 10c by the hub member 25 via a first thrust member 22 so at to be relatively rotatable. Other configurations of the support plate 10 in the second embodiment are substantially similar to that in the first embodiment.

According to the second embodiment, the same effect as that of the first embodiment may be obtained. In addition to that, although foreign objects such as water may enter the damper device from outside through the damper portion 3 and the limiter portion 2 at the side of the engine (the left side in FIG. 2), because the damper portion 3 and the limiter portion 2 are covered by means of the support plate 10 at the side of the engine (the left side in FIG. 2), a pathway through which the water enters the damper device may be blocked, as a result, possibility of decrease in performance due to rust or the like may be reduced. Further, because the damper portion 3 and the limiter portion 2 are covered by the support plate 10 at the side of the engine (the left side in FIG. 2), no additional covering member is needed, which may result in cost reduction. Furthermore, because the first thrust member 22 is positioned between the support plate 10 and the hub member 25 (the hub portion 25a), a possibility that the water enters the limiter portion 2 may be reduced, and also a possibility that the limiter portion 2 becomes eccentric from the hub may be reduced. Furthermore, because the drawing portion 10c (stepped portion) is formed at support plate 10 at a portion where the support plate 10 contacts the first thrust member 22, the support plate 10 may contact the first thrust member 22 at a relatively large area, accordingly the water proof function and the eccentricity preventing function may be improved.

Figure 3:
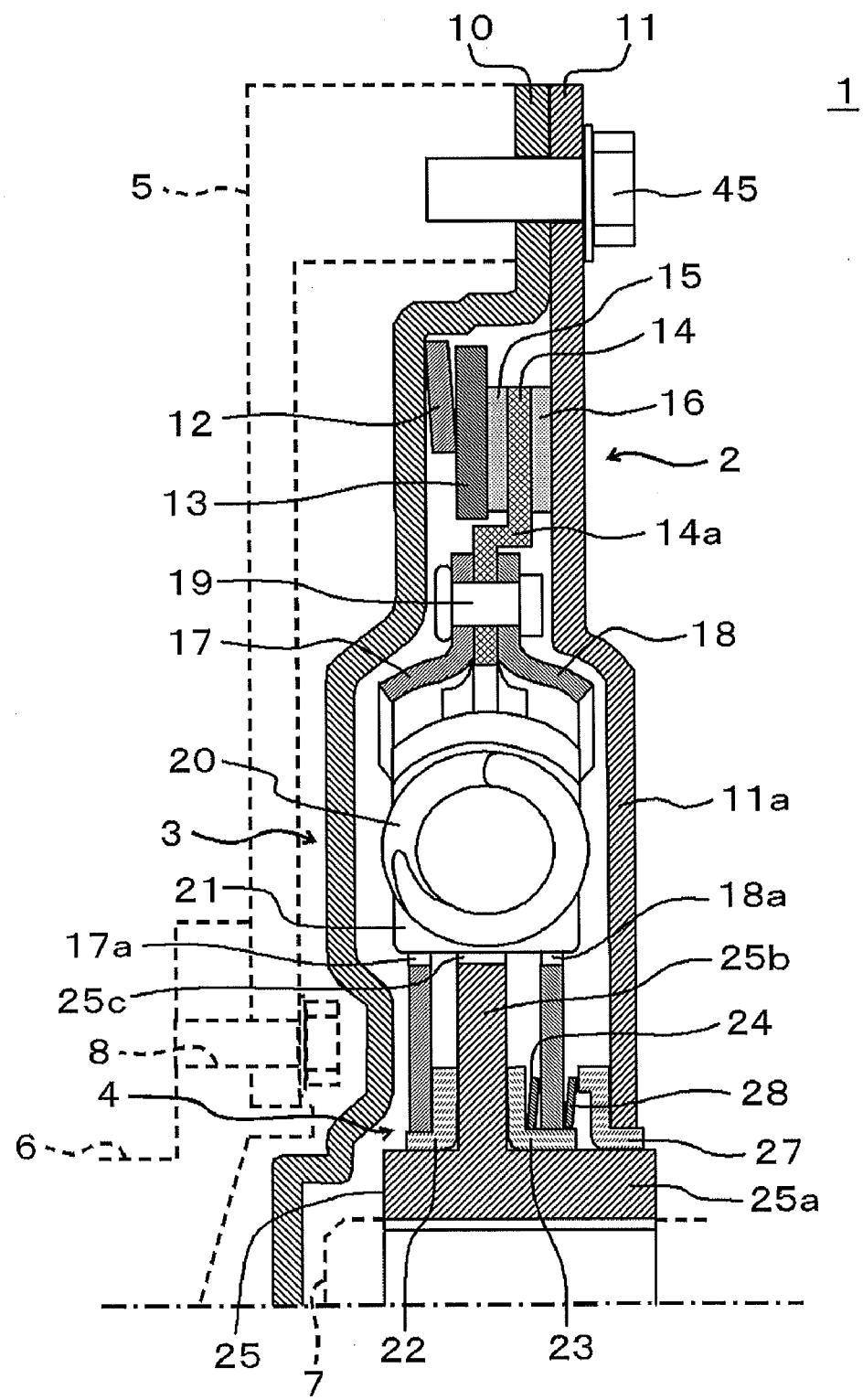
FIG. 3 illustrates a partial cross-section schematically indicating a configuration of a damper device in a third embodiment.

A damper device of third embodiment will be explained with reference to the drawings attached thereto. FIG. 3 illustrates a partial cross section schematically indicating a configuration of a damper device in the third embodiment.

According to the damper device of the first embodiment, the drawing portion (indicated by the numeral 11d in FIG. 1) is formed at the cover plate (numeral 11 in FIG. 1) in the vicinity of the inner end portion of the radially inner portion (numeral 11a in FIG. 1), and the cover plate contacts the second thrust member at the drawing portion having the relatively large contact surface. However, according to the damper device 1 in the third embodiment, the drawing portion is not formed at the radially inner portion 11a of the cover plate 11, and a thrust member 27 (e.g., the intermediate member, a first intermediate member), which is formed independently from the second thrust member 23, is positioned between the inner end portion of the radially inner portion 11a and the hub portion 25a. The thrust member 27 is biased in the axial direction of the damper device by means of a coned disc spring 28, so that the thrust member 27 is press-fitted to the radially inner portion 11a so as to be slidable. According to the damper device in the second embodiment, the support plate (indicated by the numeral 10 in FIG. 2) extends to the vicinity of the outer circumferential surface of the hub portion 25a and includes a groove on the radially inner portion, however, according to the damper device 1 in the third embodiment, the support plate 10 is formed so as to cover the hub member 25 at the side of the engine (the left side in FIG. 3). Other configurations of the damper device in the third embodiment are substantially similar to that in the first embodiment.

The thrust member 27 is formed in an annular shape and is provided between the cover plate 11 (radially inner portion 11a) and the hub member 25 (hub portion 25a). The thrust member 27 constitutes the hysteresis portion 4. Specifically, the thrust member 27 is positioned between the coned disc spring 28 and the cover plate 11 (radially inner portion 11a) in the axial direction of the damper device, and the thrust member 27 is biased by means of the coned disc spring 28 toward the cover plate 11 (radially inner portion 11a), so that the thrust member 27 is press-fitted to the cover plate 11 so as to be slidable. The thrust member 27 is also positioned between the cover plate 11 (radially inner portion 11a) and the hub member 25 (hub portion 25a) in a radial direction of the damper device, and in this configuration, the thrust member 27 functions as a bearing for supporting the cover plate 11 so as to be rotatable relative to the hub portion 25a.

The coned disc spring 28 is formed in a disc shape and is positioned between the thrust member 27 and the second side plate 18 for biasing the thrust member 27 toward the cover plate 11 (radially inner portion 11a). The coned disc spring 28 constitutes the hysteresis portion 4.

The support plate 10 is formed in a disc shape and is provided so as to cover not only the limiter portion 2 and the damper portion 3 at the side of the engine (the left side in FIG. 3), but also the hub member 25 at the side of the engine (the left side in FIG. 3). The support plate 10 does not include a groove in the vicinity of the inner end of the support plate 10. The support plate 10 is formed so as not to interfere with the damper portion 3, a head portion of a bolt 8 by which the rotational shaft of the engine 6 and the flywheel 5 are fastened, and an end portion of the rotational shaft of the transmission 7. Other configurations of the support plate 11 in the third embodiment are substantially similar to the support plate (indicated by the numeral 10 in FIG. 1) in the first embodiment.

According to the third embodiment, the same effect as that of the first embodiment may be obtained. In addition to that, because the damper portion 3 and the limiter portion 2 are covered by means of the support plate 10 at the side of the engine (the left side in FIG. 3), a pathway through which the water enters the damper device may be blocked, as a result, possibility of decrease in performance due to rust or the like may be reduced. Further, because the damper portion 3 and the limiter portion 2 are covered by the support plate 10 and the cover plate 11, no additional covering member is needed, which may result in cost reduction. Furthermore, because the thrust member 27 is positioned between the cover plate 11 and the hub member 25 (hub portion 25a), a possibility that the water enters the limiter portion 2 may further be reduced, and also a possibility that the limiter portion 2 becomes eccentric from the hub may be reduced. Furthermore, because the cover plate 11 is press-fitted to the thrust member 27 in the axial direction of the damper device, the cover plate 11 may contact the thrust member 27 with pressure at a relatively large area, accordingly the water proof function may be improved.

Figure 4:
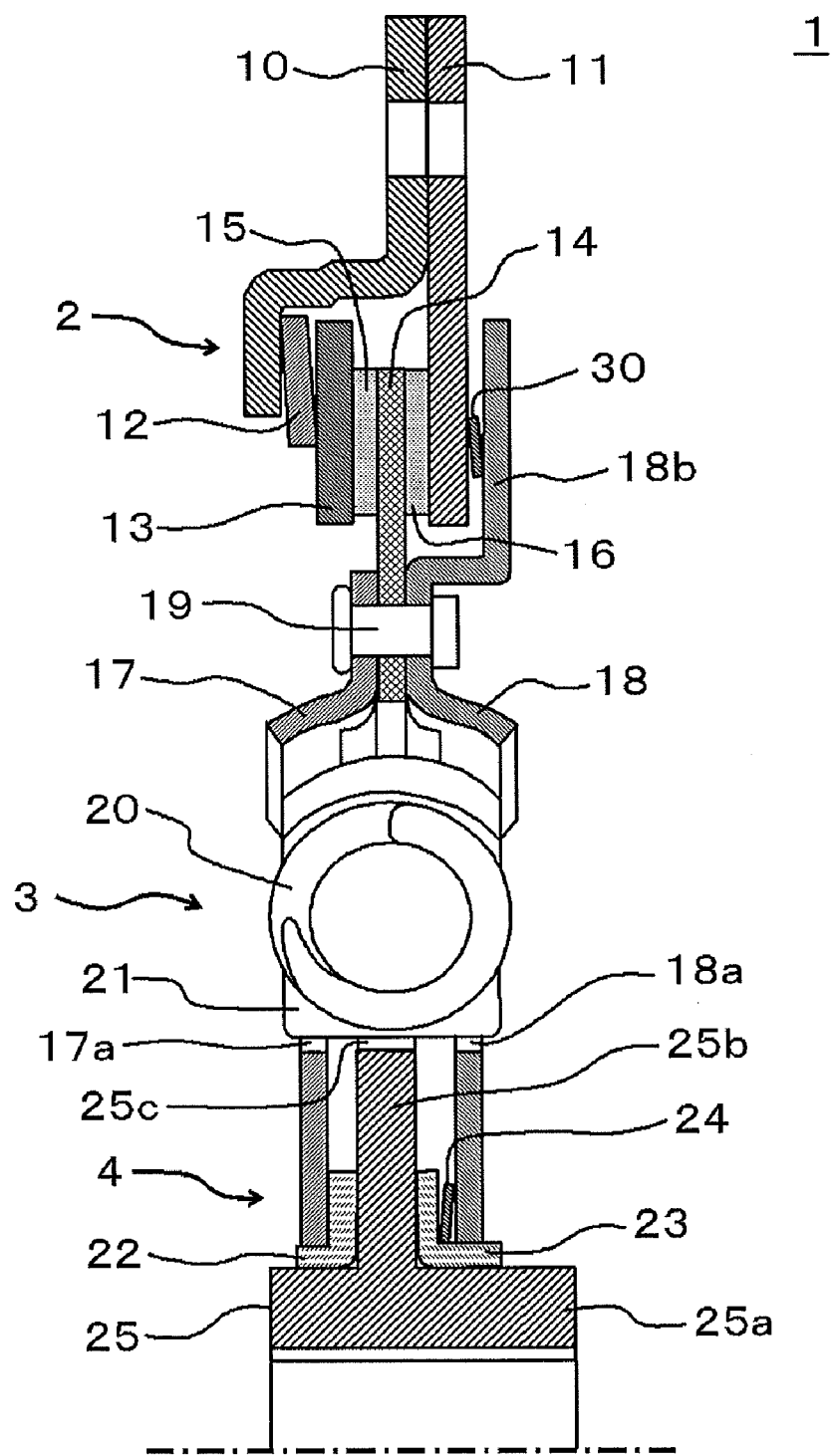
FIG. 4 illustrates a partial cross-section schematically indicating a configuration of a damper device in a fourth embodiment.

A damper device of a fourth embodiment will be explained with reference to the drawings attached thereto. FIG. 4 illustrates a partial cross section schematically indicating a configuration of a damper device in the fourth embodiment.

According to the damper device 1 in the fourth embodiment, the cover plate 11 is not formed in the same manner as that of the first embodiment (FIG. 1). Specifically, the cover plate 11 of the damper device 1 in the fourth embodiment is formed so as not to extend toward the vicinity of the hub portion 25a. Instead, a radially outer portion 18b is formed at the second side plate 18 so as to extend radially outwardly, and an elastic body 30 is provided between the radially outer portion 18b and the cover plate 11 so that water may not enter into the damper device through the limiter portion 2 at the side of the transmission (the right side in FIG. 4). Other configurations of the damper device in the fourth embodiment are substantially similar to that in the first embodiment.

Specifically, the radially outer portion 18b is formed at a radially outer portion of the second side plate 18 so as not to interfere with the limiter portion 2. The radially outer portion 18b contacts the elastic body 30 with pressure. Other configurations of the second side plate 18 in the fourth embodiment are similar to the second side plate (numeral 18 in FIG. 1) in the first embodiment.

The elastic body 30 is positioned between the cover plate 11 and the second side plate 18 (radially outer portion 18b) in order to shield the limiter portion 2 at the side of the transmission (the right side in FIG. 4) from the outside. The elastic body 30 is made of metal, resin (including a rubber) or a composite body of those materials. A coned disc spring made of metal and covered with resin is an example of the composite body.

In the example illustrated in FIG. 4, the radially outer portion 18b is formed at the second side plate 18, however; instead of forming the radially outer portion 18b, the first side plate 17 may be formed so as to include a radially outer portion. Specifically, the radially outer portion extends so as not to interfere with the limiter portion 2. In this configuration, the elastic body may be positioned between the radially outer portion and the pressure plate 13, or between the radially outer portion and the support plate 10.

According to the forth embodiment, although foreign objects such as water may enter the damper device from outside through the limiter portion 2 at the side of the transmission, because the limiter portion 2 is covered by the cover plate 11 and the second side plate 18 (radially outer portion 18b) at the side of the transmission (the right side in FIG. 4), a pathway through which the water enters the damper device may be blocked, as a result, possibility of decrease in performance due to rust or the like may be reduced. Further, because the limiter portion 2 at the side of the transmission (the right side in FIG. 4) is covered by the second side plate 18 (radially outer portion 18b), no additional covering member is needed, which may result in cost reduction. Further, because the elastic body 30 is positioned between the cover plate 11 and the second side plate 18 (radially outer portion 18b), water or the like may not enter the damper device through the space between the cover plate 11 and the second side plate 18.

Figure 5:
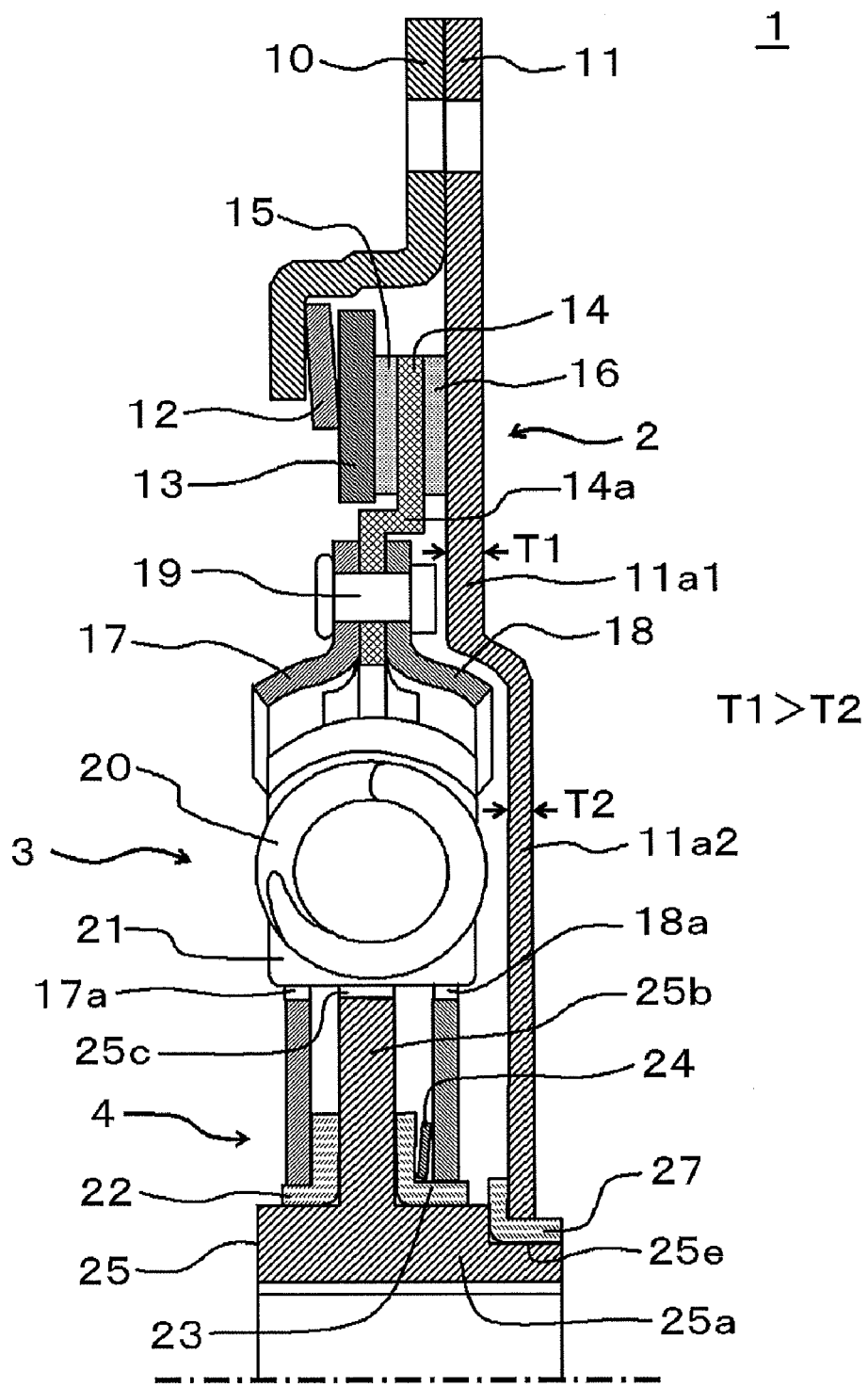
FIG. 5 illustrates a partial cross-section schematically indicating a configuration of a damper device in a fifth embodiment.

A damper device of a fifth embodiment will be explained with reference to the drawings attached thereto. FIG. 5 illustrates a partial cross section schematically indicating a configuration of a damper device in the fifth embodiment.

According to the damper device of the first embodiment, a thickness of the radially inner portion (indicated by the numeral 11a in FIG. 1) of the cover plate (indicated by the numeral 11 in FIG. 1) is not specified, however, according to the damper device of the fifth embodiment, the thickness of a radially outer portion 11a1 formed at the radially outer portion of the cover plate 11 is set so as to be larger than the thickness of a radially inner portion 11a2 formed at the radially inner portion of the cover plate 11. Further, according to the damper device 1 of the fifth embodiment, a stepped portion 25e is formed on the outer circumferential surface of the hub portion 25a of the hub member 25, and a thrust member 27 is provided between the stepped portion 25e and the cover plate 11 (radially inner portion 11a2). The thrust member 27 provided independently from the second thrust member 23 is biased by means of the cover plate 11 in the axial direction of the damper device 1, so that the thrust member 27 is press-fitted at a surface facing the axial direction of the damper device to the stepped portion 25e of the hub member 25 at a surface facing the axial direction of the damper device so as to be slidable. Other configurations of the damper device of the fifth embodiment are substantially similar to that in the first embodiment.

As described above, the thickness of the cover plate 11 is set in such a way that the thickness of the radially outer portion 11a1 differs from that of the radially inner portion 11a2. Specifically, the thickness of the radially outer portion 11a1 (hereinafter referred to as T1) is set so as to be larger than that of the radially inner portion 11a2 (hereinafter referred to as T2). The thickness T2 of the radially inner portion 11a2 is set to be equal to or more than 20% but equal to or less than 80% of the thickness T1 of the radially outer portion 11a1. The thickness T2 of the radially inner portion 11a2 is preferably set to be equal to or more than 30% but equal to or less than 70% of the thickness T1 of the radially outer portion 11a1. The radially inner portion 11a2 is supported by the hub member 25 via the thrust member 27 in the vicinity of the inner circumferential end of the radially inner portion 11a2 so as to be rotatable relative to the hub member 25 (stepped portion 25e). The radially inner portion 11a2 has a spring function (coned disc spring) for biasing the thrust member 27 toward the flange portion 25b. Other configurations of the cover plate of the fifth embodiment are substantially similar to that in the first embodiment.

The hub member 25 includes the stepped portion 25e at the hub portion 25a thereof formed so as to face the cover plate 11, and the thrust member 27 is attached to the stepped portion 25e. Other configurations of the hub member 25 are substantially similar to that in the first embodiment (25 in FIG. 1).

The thrust member 27 is an annular shaped member and is provided between the cover plate 11 (the radially inner portion 11a2) and the hub member 25 (the stepped portion 25e). Specifically, the thrust member 27 is positioned, in the axial direction of the damper device, between the surface of the stepped portion 25e facing an axial direction of the hub member 25 and the radially inner portion 11a2. In this configuration, the thrust member 27 is biased by means of the radially inner portion 11a2 toward the flange portion 25b. The thrust member 27 is also positioned, in the radial direction of the damper device, between the cover plate 11 (the radially inner portion 11a) and the hub member 25 (the stepped portion 25e). In this configuration, the thrust member 27 functions as a bearing for supporting the cover plate 11 rotatable relative to the hub portion 25a.

According to the damper device of the fifth embodiment, substantially similar effects to the first embodiment may be obtained, at the same time, the size of the damper device may be reduced because the thickness of the radially inner portion 11a2 is set to be a smaller value.

Further, because the thrust member 27 is positioned between the cover plate 11 and the hub member 25 (stepped portion 25e), a possibility that water or the like enters the limiter portion 2 of the damper device may be reduced, and also a possibility that the limiter portion 2 becomes eccentric from the hub may be reduced. Furthermore, because the radially inner portion 11a2 includes a spring function, the cover plate 11 is press-fitted to the thrust member 27 in the axial direction of the damper device, and the thrust member 27 is press-fitted to the surface of the stepped portion 25e facing the axial direction, as a result, the level of the water proof function may be increased.

Figure 6:
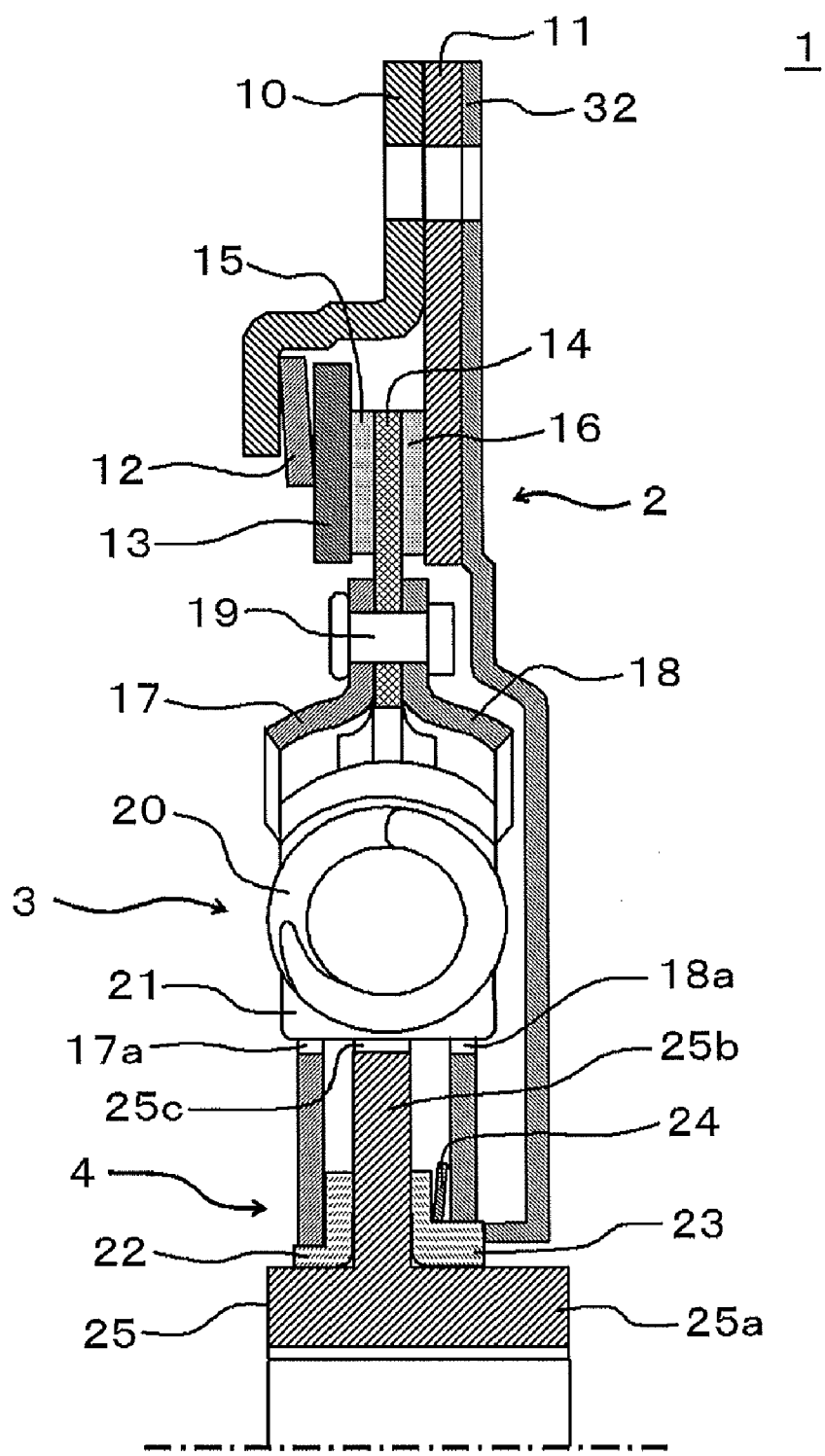
FIG. 6 illustrates a partial cross-section schematically indicating a configuration of a damper device in a sixth embodiment.

A damper device for a sixth embodiment will be explained with reference to the drawings attached thereto. FIG. 6 illustrates a partial cross section schematically indicating a configuration of a damper device in the sixth embodiment.

According to the damper device in the sixth embodiment, a cover member 32 (e.g., a first cover member) is provided so as to cover the damper portion 3 and the limiter portion 2 instead of the cover plate 11 extending toward the hub portion 25a (e.g., the cover plate 11 of the first embodiment illustrated in FIG. 1). Other configurations of the damper device are similar to that in the first embodiment.

The cover member 32 covers the limiter portion 2 and the damper portion 3 at the side of the transmission (right side in FIG. 6) and is provided to the cover plate 11 at the side of the transmission (right side in FIG. 6). At a radially outer portion of the cover member 32, the cover member 32 is fixed to the support plate 10 and the cover plate 11 so as to be integral therewith by means of a rivet (corresponding to a member indicated by a numeral 34 in FIG. 12A). Further, the cover member 32 includes a spring function and is press-fitted at a radially inner portion of the cover member 32 to the second thrust member 23 so as to be slidable.

According to the sixth embodiment, although foreign objects such as water may enter the damper device from outside through the damper portion 3 and the limiter portion 2 at the side of the transmission, because the damper portion 3 and the limiter portion 2 are covered by the cover member 32 at the side of the transmission (the right side in FIG. 6), a pathway through which the water enters the damper device may be blocked, as a result, possibility of decrease in performance due to rust or the like may be reduced.

Figure 7:
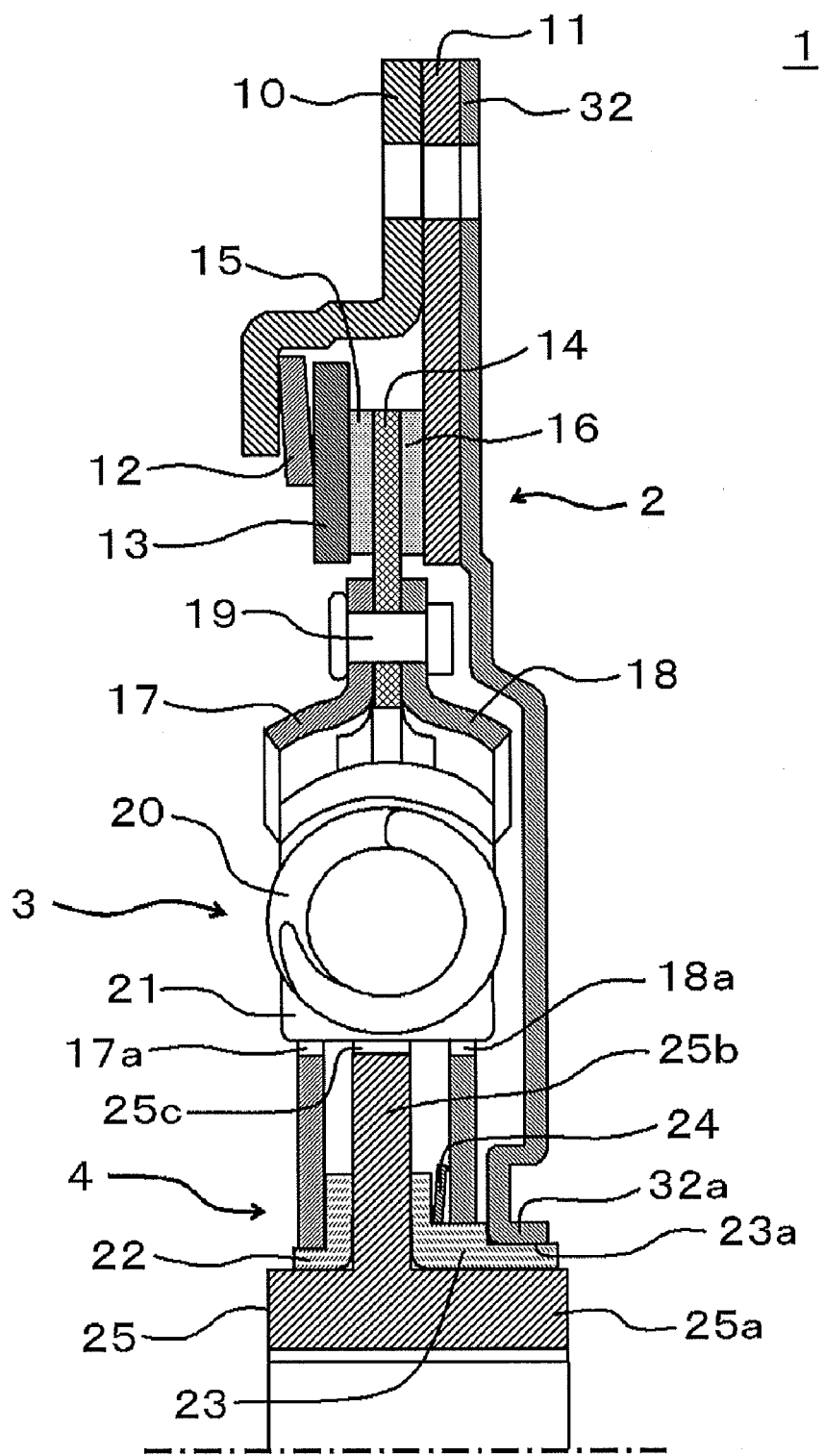
FIG. 7 illustrates a partial cross-section schematically indicating a configuration of a damper device in a seventh embodiment.

A seventh embodiment will be explained with reference to the drawings attached thereto. FIG. 7 illustrates a partial cross section schematically indicating a configuration of a damper device in the seventh embodiment.

The damper device in the seventh embodiment includes the cover member 32 in the same manner as that in the sixth embodiment, however; the shape of the cover member 32 in the seventh embodiment is different from that of the sixth embodiment. Specifically, the cover member 32 of the seventh embodiment includes a drawing portion 32a (e.g., stepped portion) that is formed in the vicinity of a radially inner end portion of the cover member 32 by means of press molding. The damper device in the seventh embodiment also includes the second thrust member 23 in the same manner as in the sixth embodiment; however, the shape of the second thrust member 23 is different from that of the sixth embodiment. Specifically, a stepped portion 23a is formed at the second thrust member 23 so as to correspond to an inner circumferential surface of the drawing portion 32a of the cover member 32. In this configuration, the cover member 32 is supported at the inner circumferential surface of the drawing portion 32a by the hub member 25 (hub portion 25a) so as to be relatively rotatable via the stepped portion 23a of the second thrust member 23. Further, in the seventh embodiment, the cover member 32 biases the second thrust member 23 toward the flange portion 25b. Other configurations are substantially similar to that of the sixth embodiment.

According to the damper device in the seventh embodiment, substantially similar effects to the sixth embodiment may be obtained, at the same time, because the second thrust member 23 (stepped portion 23a) is positioned between the cover member 32 and the hub member 25 (stepped portion 25e), a possibility that water or the like enters the limiter portion 2 of the damper device may be reduced, and also a possibility that the limiter portion 2 becomes eccentric from the hub may be reduced. Furthermore, because the stepped portion 23a is formed at the second thrust member 23, and the cover member 32 contacts the second thrust member 23 at a relatively large area (the stepped portion 23a), the water proof function and the eccentricity preventing function may be improved. Furthermore, because the cover member 32 has a spring function, a spring such as a coned disc spring 24 may not be additionally provided, as a result, the number of the parts of the damper device may be decreased, and accordingly the costs of the damper device may be decreased.

Figure 8:
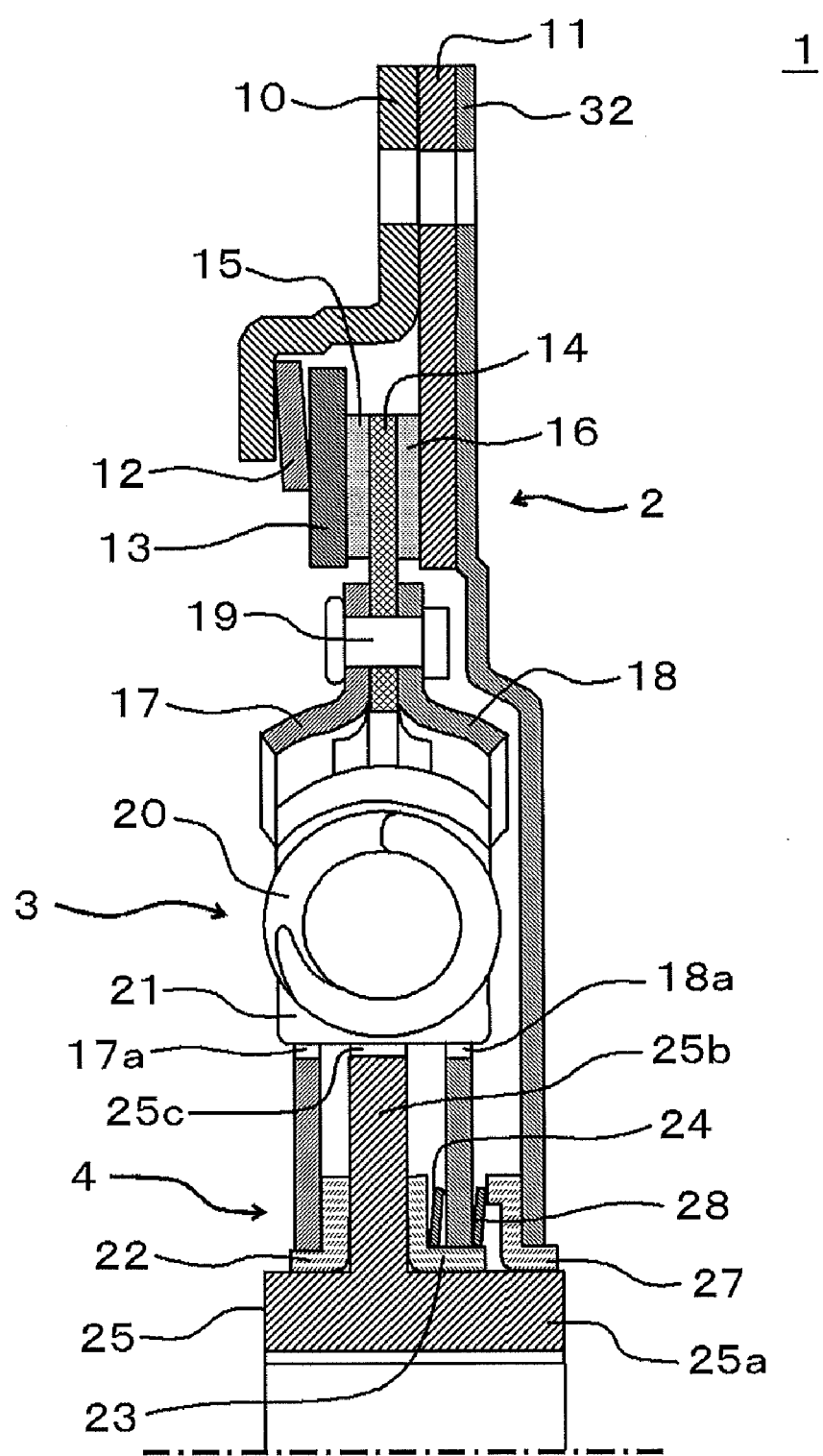
FIG. 8 illustrates a partial cross-section schematically indicating a configuration of a damper device in a eighth embodiment.

A damper device of an eighth embodiment will be explained with reference to the drawings attached thereto. FIG. 8 illustrates a partial cross section schematically indicating a configuration of a damper device in the eighth embodiment.

According to the damper device in the sixth embodiment, the cover member (indicated by the numeral 32 in FIG. 6) has a spring function, and the cover member is press-fitted to the second thrust member (indicated by the numeral 23 in FIG. 6) at the radially inner end portion of the cover member so as to be slidable. The damper device 1 in the eighth embodiment includes a thrust member 27 provided independently from the second thrust member 23 and positioned between a radially inner end of the cover member 32 and the outer circumferential surface of the hub portion 25a, and thrust member 27 is biased by means of the coned disc spring 28 in the axial direction of the damper device in such a way that the thrust member 27 is press-fitted to the cover member 32 so as to be slidable. Other configurations are substantially similar to that in the sixth embodiment.

The thrust member 27 is formed in an annular shape and is provided between the cover member 32 and the hub member 25 (hub portion 25a), and the thrust member 27 constitutes the hysteresis portion 4. Specifically, the thrust member 27 is positioned between the coned disc spring 28 and the cover member 32 in the axial direction of the damper device, and the coned disc spring 28 biases the thrust member 27 toward the cover member 32 so that the thrust member 27 is press-fitted to the cover member 32 so as to be slidable. Further, the thrust member 27 is also positioned between the cover member 32 and the hub member 25 (hub portion 25a) in the radial direction of the damper device, and the thrust member 27 functions as a bearing for supporting the cover member 32 so as to be rotatable relative to the hub portion 25a.

The coned disc spring 28 is a disc shaped spring for biasing the thrust member 27 toward the cover member 32 and is provided between the thrust member 27 and the second side plate 18. The coned disc spring 28 constitutes the hysteresis portion 4.

According to the eighth embodiment, although foreign objects such as water may enter the damper device from outside through the damper portion 3 and the limiter portion 2 at the side of the transmission, because the damper portion 3 and the limiter portion 2 are covered by the cover member 32 at the side of the transmission (the right side in FIG. 8), a pathway through which the water enters the damper device may be blocked, as a result, possibility of decrease in performance due to rust or the like may be reduced. Further, because the thrust member 27 is positioned between the cover member 32 and the hub member 25 (stepped portion 25e), a possibility that water or the like enters the limiter portion 2 of the damper device may be reduced, and also a possibility that the limiter portion 2 becomes eccentric from the hub may be reduced. Furthermore, because the cover member 32 contacts the thrust member 27 with pressure in an axial direction, the cover member 32 may contact thrust the member 27 with pressure at a relatively large area, accordingly the waterproof function may be improved.

Figure 9:
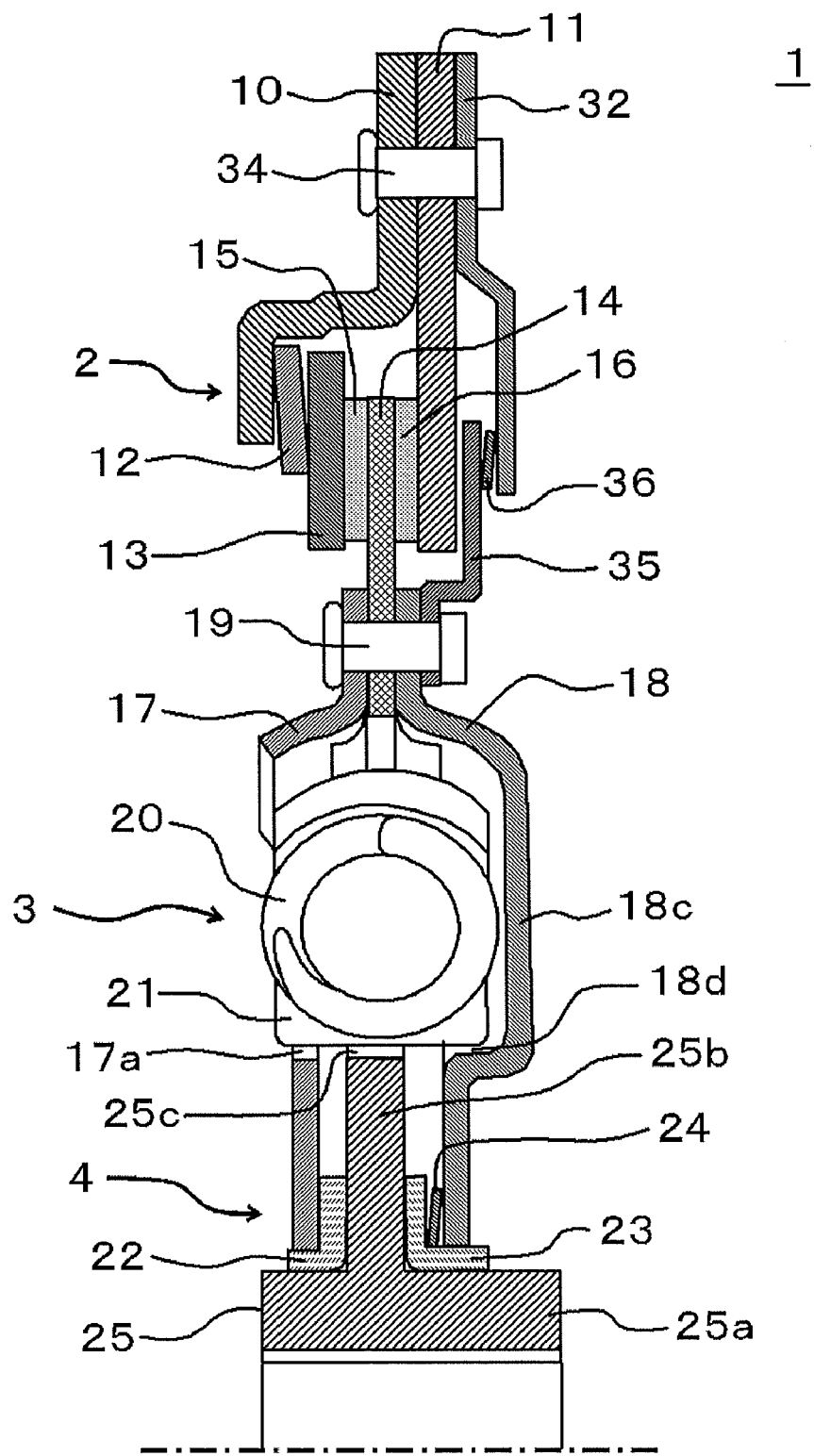
FIG. 9 illustrates a partial cross-section schematically indicating a configuration of a damper device in a ninth embodiment.

A damper device of a ninth embodiment will be explained with reference to the drawings attached thereto. FIG. 9 illustrates a partial cross section schematically indicating a configuration of a damper device in the ninth embodiment.

According to the damper device in the sixth embodiment, the cover member (indicated by the numeral 32 in FIG. 6) is formed so as to extend to the vicinity of the hub portion (indicated by the numeral 25a in FIG. 6), and the limiter portion 2 and the damper portion 3 are covered by the cover member. According to the damper device in the ninth embodiment, the cover member 32 is formed so as to partially cover the limiter portion 2, and the entire limiter portion 2 is covered by a combination of the cover member 32, a cover member 35 (e.g., a second cover member) and an elastic body 36 at the side of the transmission (the right side in FIG. 9). Instead of the window portion (indicated by the numeral 18 in FIG. 6) formed on the second side plate 18 in the sixth embodiment, a cover portion 18c is formed at the second side plate 18 of the damper device in the ninth embodiment, and the damper portion 3 is covered by the cover portion 18c at the side of the transmission (the right side in FIG. 9). Other configurations are similar to that in the sixth embodiment.

As mentioned above, the cover member 32 is formed so as to cover the part of the limiter portion 2 at the side of the transmission (the right side in FIG. 9). Specifically, the cover member 32 is arranged in such a way that a radially outer portion thereof contacts a right surface of the cover plate 11 in FIG. 9, and the cover member 32 is fixed by means of the rivet 34 together with the support plate 10 and the cover plate 11 so as to be integral therewith. More specifically, the cover member 32 is arranged so as to be distant from the cover plate 11 at a radially inner portion thereof and is press-fitted to the elastic body 36 at a left surface of the radially inner portion of the cover member 32 in FIG. 9 (the surface facing the cover plate 11).

The cover member 35 is formed so as to cover another part of the limiter portion 2 at the side of the transmission (the right side in FIG. 9). The cover member 35 is positioned at the right side of the second side plate 18 (at the side of the transmission) and fixed at a radially inner portion of the cover member 35 to the first side plate 17, the lining plate 14 and the second side plate 18 so as to be integral therewith by means of the rivet 19. The radially outer portion of the cover member 35 extends so as to be positioned between the cover plate 11 and the cover member 32, and the cover member 35 is press-fitted to the elastic body 36 at a right surface of the cover member 35 in FIG. 9 (the surface facing the cover member 32).

The elastic body 36 is positioned between the cover member 32 and the cover member 35 and functions to seal the limiter portion 2 at the side of the transmission (the right side in FIG. 9) from the outside. The elastic body 36 is made of metal, resin (including a rubber) or a composite body of those materials. A coned disc spring made of metal and covered with resin is an example of the composite body.

The second side plate 18 is fixed at a radially outer portion thereof to the lining plate 14, the first side plate 17 and the cover member 35 so as to be integral therewith by means of a rivet 19. A housing portion 18d is formed at a radially intermediate portion of the second side plate 18, which corresponds to the damper portion 3, and the coil spring 20 and the seat members 21 (first and second seat members 21) are housed in the housing portion 18d. Specifically, one end surface of the housing portion 18d in a circumferential direction contacts the first seat member 21 so as to be detachable, and the other end surface of the housing portion 18d in a circumferential direction contacts the second seat member 21 so as to be detachable. The window portion is not formed at the housing portion 18d, and the cover portion 18c is formed so as to cover the damper portion 3 at the side of the transmission (the right side in FIG. 9).

According to the ninth embodiment, although foreign objects such as water may enter the damper device from outside through the damper portion 3 and the limiter portion 2 at the side of the transmission, because the limiter portion 2 is covered by means of the combination of the cover member 32, the cover member 35 and the elastic body 36 at the side of the transmission (the right side in FIG. 9), and because the damper portion 3 is covered by the cover portion 18c of the second side plate 18 at the side of the transmission (the right side in FIG. 9), a pathway through which the water enters the damper device may be blocked, as a result, possibility of decrease in performance due to rust or the like may be reduced.

Figure 10:
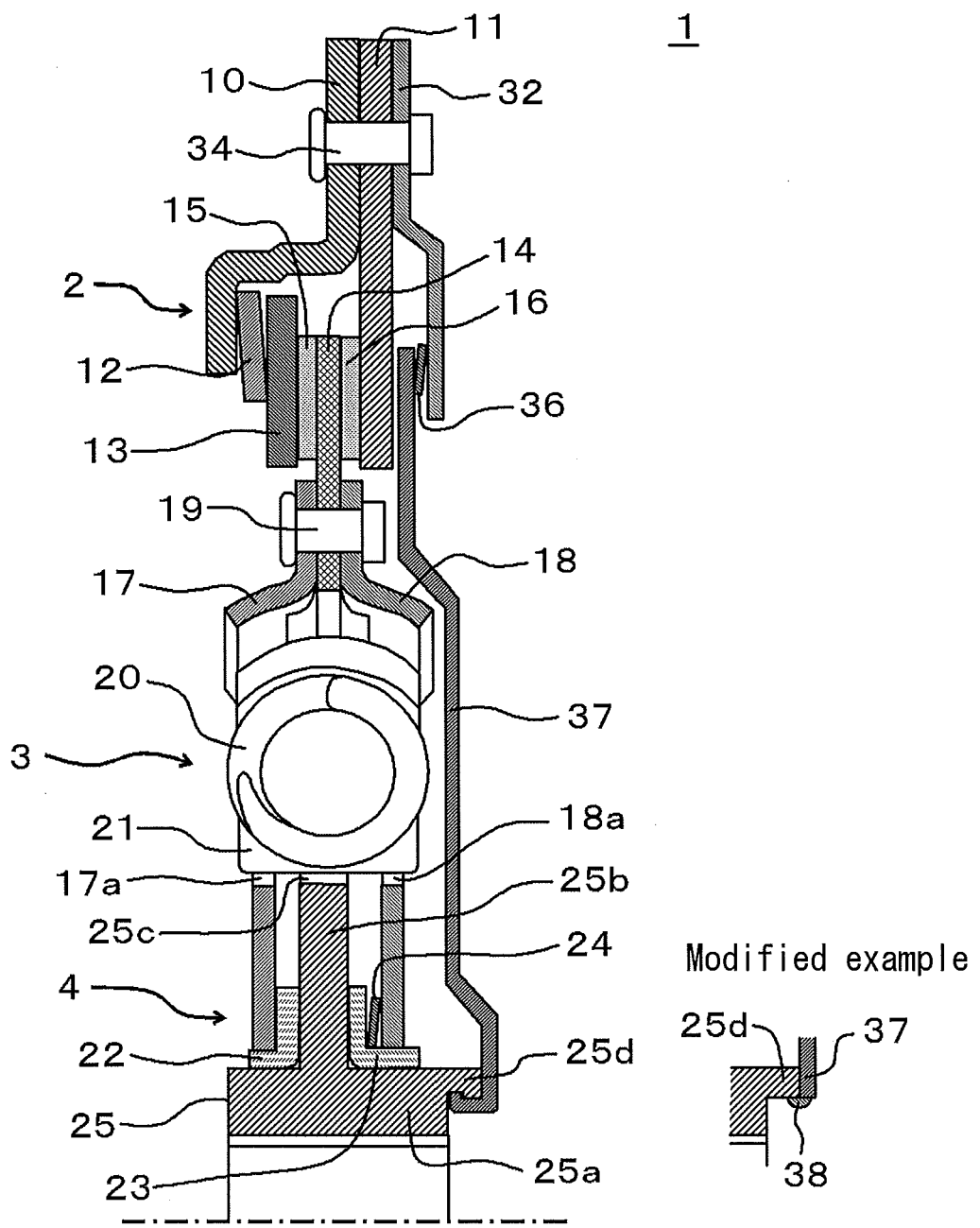
FIG. 10 illustrates a partial cross-section schematically indicating a configuration of a damper device in a tenth embodiment.

A damper device of a tenth embodiment will be explained with reference to the drawings attached thereto. FIG. 10 illustrates a partial cross section schematically indicating a configuration of a damper device in the tenth embodiment.

According to the damper device in the ninth embodiment, the cover member (indicated by the numeral 35 in FIG. 9) is fixed to the second side plate (indicated by the numeral 18 in FIG. 9) and the like so as to be integral therewith by means of the rivet (indicated by the numeral 19 in FIG. 19), however; according to the damper device 1 in the tenth embodiment, a cover member 37 (e.g., the second cover member) is swaged or welded to the hub member 25 (projecting portion 25d), and the limiter portion 2 and the damper portion 3 are covered by a combination of the cover member 32, the elastic body 36 and the cover member 37 at the side of the transmission (the right side in FIG. 10). Furthermore, because the cover member 37 covers the damper portion 3 at the side of the transmission (the right side in FIG. 10), the cover portion (indicated by the numeral 18c in FIG. 9) is not formed at the second side plate 18. Other configurations are substantially similar to that in the ninth embodiment.

The cover member 37 covers a part of the limiter portion 2 at the side of the transmission (the right side in FIG. 10) and covers the entire damper portion 3 at the side of the transmission (the right side in FIG. 10). The cover member 37 is positioned at the right side of the hub portion 25a in FIG. 10 (at the side of the transmission), and the cover member 37 is swaged at a radially inner portion thereof to a projecting portion 25d formed at the hub portion 25a. As indicated in a modified example illustrated in FIG. 10, the cover member 37 may be welded (i.e., welded by means of a welded portion 38) to the projecting portion 25d of the hub portion 25a. The cover member 37 is positioned in such a way that a radially outer portion thereof is positioned between the cover plate 11 and the cover member 32 and is press-fitted to the elastic body 36 at a surface facing the cover member 32.

According to the tenth embodiment, although foreign objects such as water may enter the damper device from outside through the damper portion 3 and the limiter portion 2 at the side of the transmission, because the damper portion 3 and the limiter portion 2 are covered by means of the combination of the cover member 32, the cover member 37 and the elastic body 36 at the side of the transmission (the right side in FIG. 10), a pathway through which the water enters the damper device may be blocked, as a result, possibility of decrease in performance due to rust or the like may be reduced.

Figure 11:
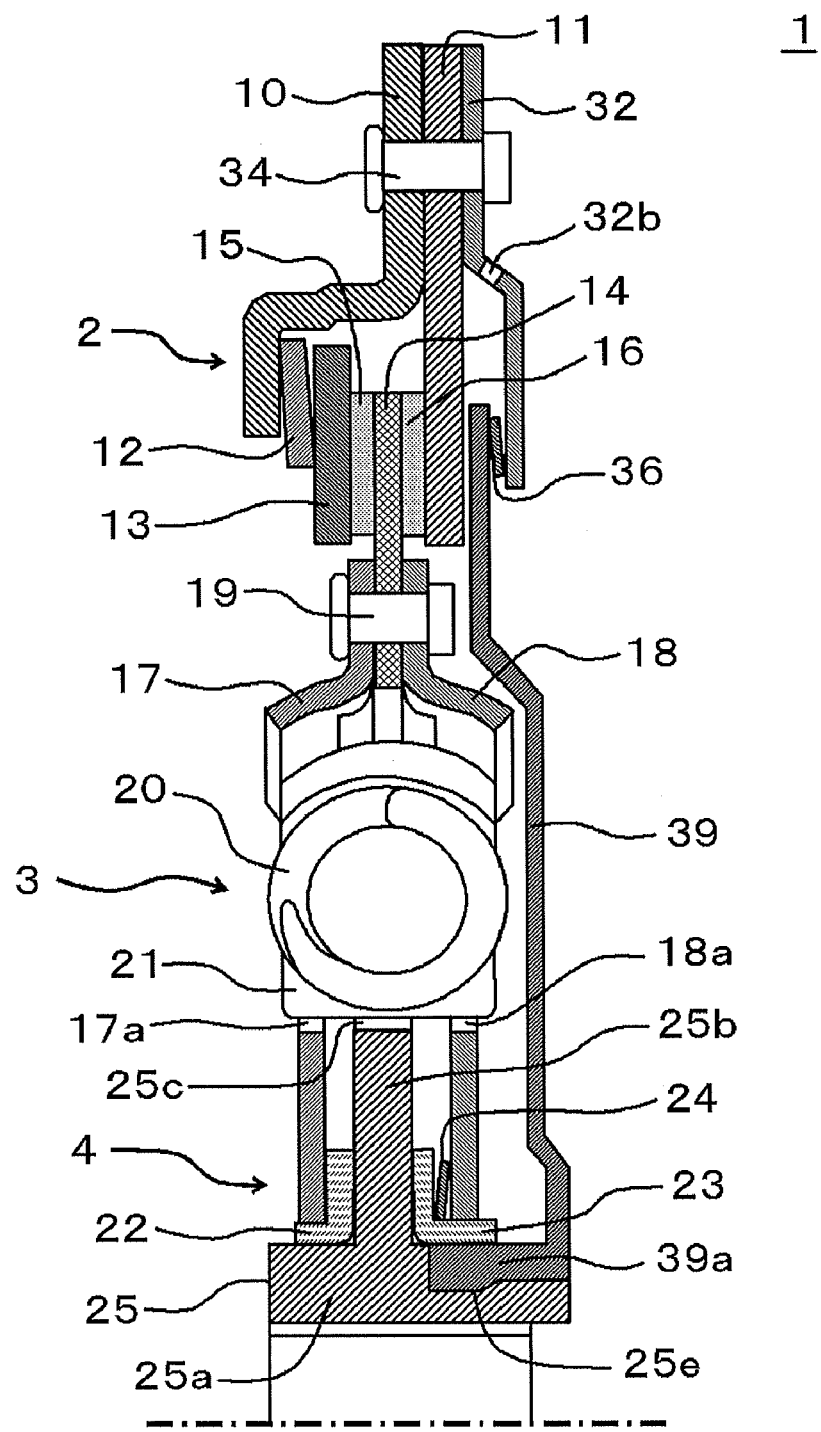
FIG. 11 illustrates a partial cross-section schematically indicating a configuration of a damper device in a eleventh embodiment.

A damper device of an eleventh embodiment will be explained with reference to the drawings attached thereto. FIG. 11 illustrates a partial cross section schematically indicating a configuration of a damper device in the eleventh embodiment.

According to the damper device in the tenth embodiment, the cover member (indicated by the numeral 37 in FIG. 10) is swaged to the hub member 25, however; according to the damper device in eleventh embodiment, a cover member 39 (e.g., the second cover member) is formed so as to be mountable to the hub member 25. Specifically, a cylindrical portion 39a is formed at the radially inner portion of the cover member 39, and the cylindrical portion 39a functions as a part of the hub member 25 when the cover member 39 is mounted to the hub member 25. Further, the cover member 32 includes a hole 32b through which water drains out. Other configurations are substantially similar to that in the tenth embodiment.

The cover member 39 covers a part of the limiter portion 2 at the side of the transmission (the right side in FIG. 11) and covers an entire area of the damper portion 3 at the side of the transmission (the right side in FIG. 11). The cylindrical portion 39a is formed at the inner circumferential surface of the cover member 39, and the cover member 39 is mounted to the hub member 25 in such a way that the cylindrical portion 39a fits to the outer circumferential surface of the stepped portion 25e of the hub member 25. The cylindrical portion 39a supports the second side plate 18 via the second thrust member 23 so as to be relatively rotatable. A radially outer portion of the cover member 39 is positioned between the cover plate 11 and the cover member 32, and the cover member 39 is press-fitted at the radially outer portion to the elastic body 36 at the surface facing the cover member 32.

The stepped portion 25e is formed at the outer circumferential surface of the hub member 25 at the right portion thereof relative to the flange portion 25b (at the side of the second side plate 18), and the cover member 39 is mounted to the hub member 25 in such a way that the cylindrical portion 39a fits the stepped portion 25e of the hub member 25. Other configurations are substantially similar to that of the hub member in the first embodiment (indicated by the numeral 25 in FIG. 1).

The cover member 32 includes a radially inner portion and a radially outer portion, and the cover member 32 contacts the cover plate 11 at the radially outer portion of the cover member 32 and is distant from the cover plate 11 at the radially inner portion of the cover member 32. In this configuration, the hole 32b through which water and like drains is formed at a radially outer end portion of the radially inner portion of the cover member 32. The water entering the damper device drains out from the hole 32b by the action of centrifugal force and/or gravity, accordingly a possibility that water enters in the damper device through the hole 32b against the centrifugal force and/or gravity is low. Even when water enters in the damper device through the hole 32b, the water may immediately drain out from the hole 32b because of the action of centrifugal force and/or gravity. Other configurations of the cover member 32 are substantially similar to that in the tenth embodiment (indicated by the numeral 32 in FIG. 10).

According to the eleventh embodiment, although foreign objects such as water may enter the damper device from outside through the damper portion 3 and the limiter portion 2 at the side of the transmission, because the damper portion 3 and the limiter portion 2 are covered by means of the combination of the cover member 32, the cover member 39 and the elastic body 36 at the side of the transmission (the right side in FIG. 11), a pathway through which the water enters the damper device may be blocked, as a result, possibility of decrease in performance due to rust or the like may be reduced. Further, the water entering the damper device may drain out from the hole 32b. Furthermore, the mountability of the cover member 39 onto the hub member 25 may be improved.

A damper device of a twelfth embodiment will be explained with reference to the drawings attached thereto. FIG. 12 illustrates partial cross sections schematically indicating four examples of supporting manners of a cover member of the damper device in the twelfth embodiment.

Figure 12A:
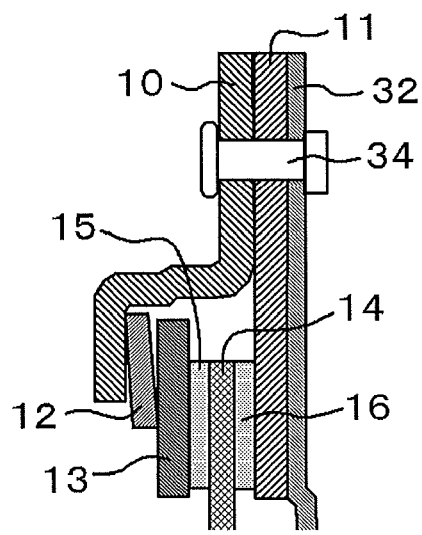
FIG. 12 illustrates partial cross sections schematically indicating four examples of supporting manners of a cover member of a damper device in a twelfth embodiment.
Figure 12C:
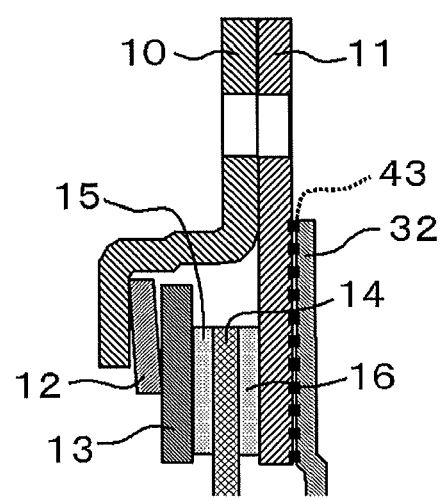
Figure 12B:
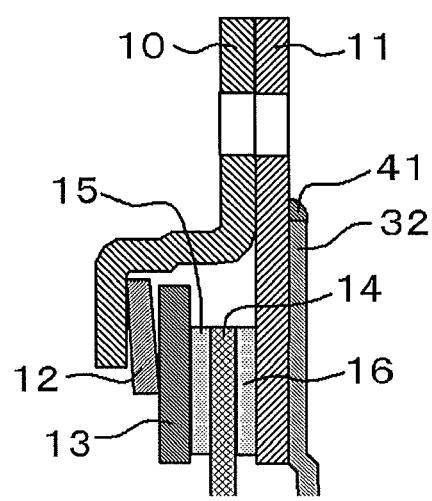
Figure 12D:
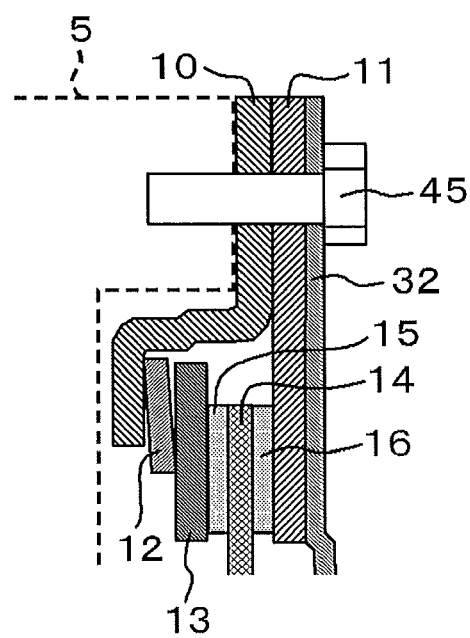

According to the damper devices in the sixth to eleventh embodiments, the cover member 32 is fixed by means of the rivet 34 as illustrated in the drawing of FIG. 12A, however, the cover member 32 may be welded (welded portion 41) to the cover plate 11 as illustrated in the drawing of FIG. 12B, the cover member 32 may be fixed to the cover plate 11 by use of adhesive agent (bonded portion 43), or the cover member 32 may be fixed to the fly wheel 5 together with the cover plate 11 and the support plate 10 by use of a bolt 45 as illustrated in the drawing of FIG. 12D. The cover member 32 may be fixed to the cover plate 11 by means of wedging, fitting or any other fixing means.

Configurations indicated in the drawings of FIGS. 20A to 20C, which will be described later in detail, may be applied to the damper devices in the first to twelfth embodiments.

Figure 13:
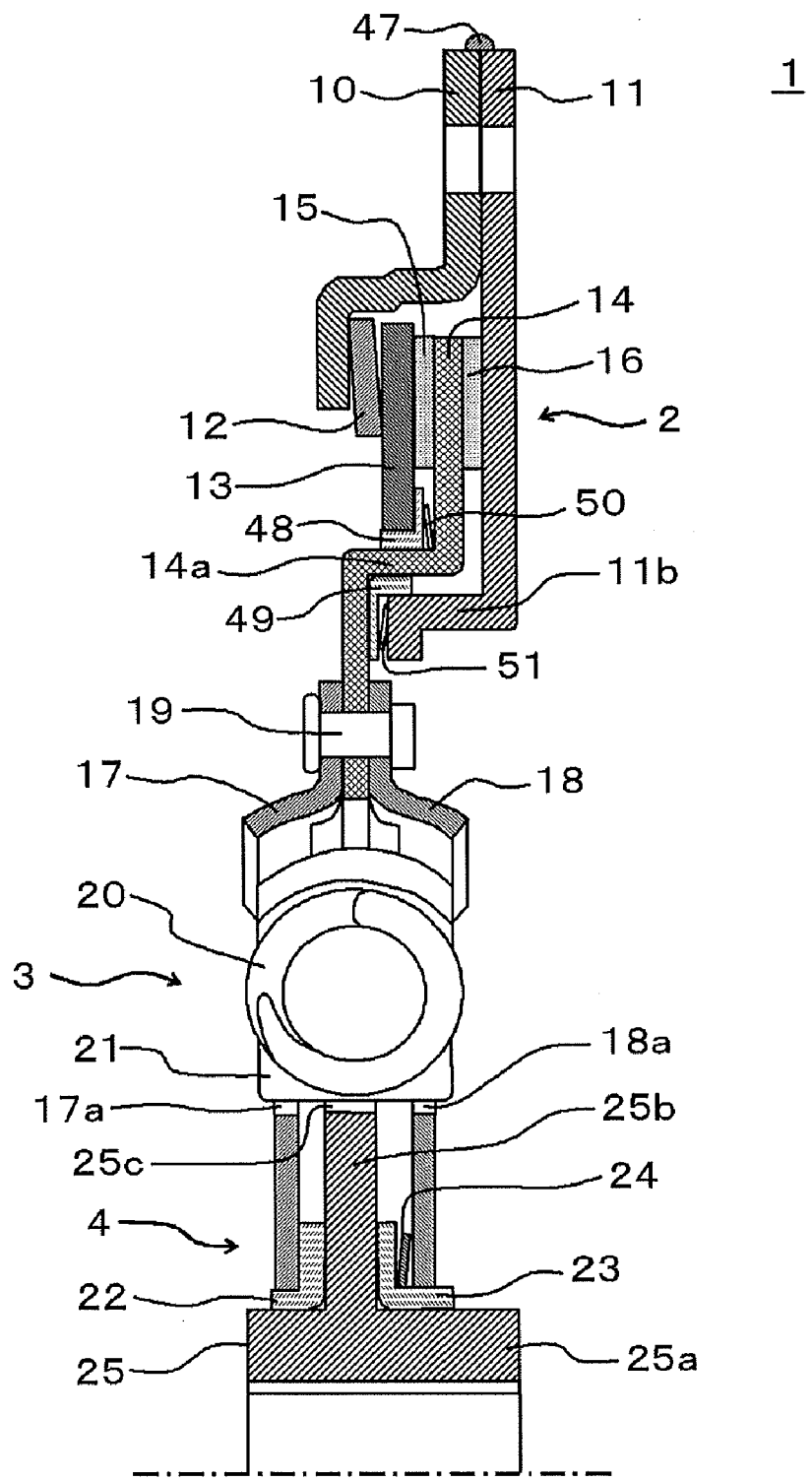
FIG. 13 illustrates a partial cross-section schematically indicating a configuration of a damper device in a thirteenth embodiment.

A damper device of a thirteenth embodiment will be explained with reference to the drawings attached thereto. FIG. 13 illustrates a partial cross section schematically indicating a configuration of a damper device in the thirteenth embodiment.

According to the damper device 1 in the thirteenth embodiment, only the limiter portion 2 is water proofed. Specifically, a thrust member 49 (e.g., a second intermediate member) is positioned between the cover plate 11 and the lining plate 14, and the thrust member 49 is biased by means of an elastic body 51 (e.g., a second elastic body) so as to be press-fitted to the lining plate 14. Further, a thrust member 48 (e.g., a first intermediate member) is positioned between the pressure plate 13 and the lining plate 14, and the thrust member 48 is biased by means of an elastic body 50 (e.g., a first elastic body) so as to be press-fitted to the pressure plate 13. Further, the support plate 10 is welded to the cover plate 11 at an outer circumferential surface thereof (welded portion 47) as illustrated in the drawing in FIG. 13. Other configurations are substantially similar to that in the first embodiment.

The cover plate 11 includes a stepped portion 11b (e.g., a second stepped portion) in the vicinity of a radially inner end portion thereof corresponding to a radially inner portion of the damper device relative to the limiter portion 2. The stepped portion 11b is formed so as to correspond to a stepped portion 14a (e.g., a first stepped portion) of the lining plate 14 by forming a space therebetween in both radial and axial directions. The lining plate 14 is supported at an inner circumferential surface of the stepped portion 14a by means of the cover plate 11 at an outer circumferential surface of the stepped portion 11b thereof via the thrust member 49 so as to be relatively rotatable. The elastic body 51 is supported by the stepped portion 11b at an end surface thereof facing the lining plate 14. Other configurations of the cover plate 11 in the thirteenth embodiment are substantially similar to that of the cover plate (indicated by the numeral 11 in FIG. 1) in the first embodiment.

The lining plate 14 includes a radially outer portion, a radially inner portion and a stepped portion 14a formed at an intermediate portion of the lining plate 14 in the radial direction. The lining plate 14 is arranged in a manner where the radially outer portion thereof is positioned so as to be closer to the cover plate 11 than the radially inner portion of the lining plate 14, and the stepped portion 14a of the lining plate 14 corresponds to the stepped portion 11b of the cover plate 11 by forming a space therebetween in both radially and axial directions. The pressure plate 13 is supported by the stepped portion 14a at the outer circumferential surface thereof via the thrust member 48 so as to be relatively rotatable. The elastic body 50 is supported by the stepped portion 14a at the surface thereof facing the pressure plate 13, which corresponds to a radially inner portion of the limiter portion 2. The stepped portion 14a is supported at an inner circumferential surface thereof by the cover plate 11 via the thrust member 49 so as to be relatively rotatable. The thrust member 49 is supported by the stepped portion 14a at the surface thereof facing the cover plate 11, which corresponds to a radially outer portion of the damper portion 3. Other configurations of the lining plate 14 in the thirteenth embodiment are similar to that of the lining plate (indicated by the numeral 14 in FIG. 1) in the first embodiment.

The thrust member 48 is formed in an annular shape and is provided between the pressure plate 13 and the lining plate 14. Specifically, the thrust member 48 is positioned between the pressure plate 13 and the elastic body 50 in the axial direction of the damper device, and the thrust member 48 is biased toward the pressure plate 13 by means of the elastic body 50 and is press-fitted to the pressure plate 13 so as to be slidable. The thrust member 48 is also positioned between the pressure plate 13 and the lining plate 14 (stepped portion 14a) in a radial direction of the damper device, and the thrust member 48 functions as a bearing for supporting the pressure plate 13 so as to be rotatable relative to the lining plate 14 (stepped portion 14a).

The thrust member 49 is formed in an annular shape and is provided between the cover plate 11 and the lining plate 14. Specifically, the thrust member 49 is positioned between the lining plate 14 and the elastic body 51 in the axial direction of the damper device, and the thrust member 49 is biased toward the lining plate 14 by means of the elastic body 50 and is press-fitted to the lining plate 14 so as to be slidable. The thrust member 49 is also positioned between the cover plate 11 (stepped portion 11b) and the lining plate 14 (stepped portion 14a) in a radial direction of the damper device, and the thrust member 49 functions as a bearing for supporting the lining plate 14 (stepped portion 14a) so as to be rotatable relative to the cover plate 11 (stepped portion 11b).

The elastic body 50 is positioned between the thrust member 48 and the lining plate 14 in order to generate a biasing force (elastic force) applied to the thrust member 48 so as to move toward the pressure plate 13. The elastic body 50 is made of metal, resin (including a rubber) or a composite body of those materials. A coned disc spring made of metal and covered with resin is an example of the composite body.

The elastic body 51 positioned between the thrust member 49 and the cover plate 11 in order to generate a biasing force (elastic force) applied to the thrust member 49 so as to move toward the lining plate 14. The elastic body 51 is made of metal, resin (including a rubber) or a composite body of those materials. A coned disc spring made of metal and covered with resin is an example of the composite body.

In the example illustrated in FIG. 13, the thrust member 48 is provided between the pressure plate 13 and the lining plate 14, however, instead of providing the pressure plate 13, the support plate 10 may be formed so as to extend toward the vicinity of the lining plate 14, and the thrust member 48 may be provided between the modified support plate 10 and the lining plate 14. In this configuration, the thrust member 48 may be biased by means of a coned disc spring so as to be press-fitted to the support plate 10.

According to the thirteenth embodiment, because the clearances of the limiter portion 2 are covered with the thrust members 48 and 49, a pathway through which the water enters the damper device may be blocked, as a result, possibility of decrease in performance due to rust or the like may be reduced. Further, in the thirteenth embodiment, the thrust member 48 is press-fitted to the pressure plate 13 by means of the elastic body 50, and the thrust member 49 is press-fitted to the lining plate 14 by means of the elastic body 51. Thus, even when the thrust members 48 and 49 are worn relative to the pressure plate 13 and the lining plate 14, because each of the thrust members 48 and 49 is press-fitted to the corresponding member, the worn portion may be compensated, and water and the like may not enter the damper device. Accordingly, the waterproof function may be effectively improved. Further, in the thirteenth embodiment, the thrust member 48 is provided between the pressure plate 13 and the lining plate 14 (stepped portion 14a), and the thrust member 49 is provided between the cover plate 11 (stepped portion 11b) and the lining plate 14 (stepped portion 14a). Accordingly, a possibility that the limiter portion 2 becomes eccentric from the hub may be reduced. Furthermore, because the support plate 10 is welded to the cover plate 11 at an outer circumferential surface thereof (welded portion 47), the water may not enter the damper device from the outside of the outer circumferential surface of the damper device.

Figure 14:
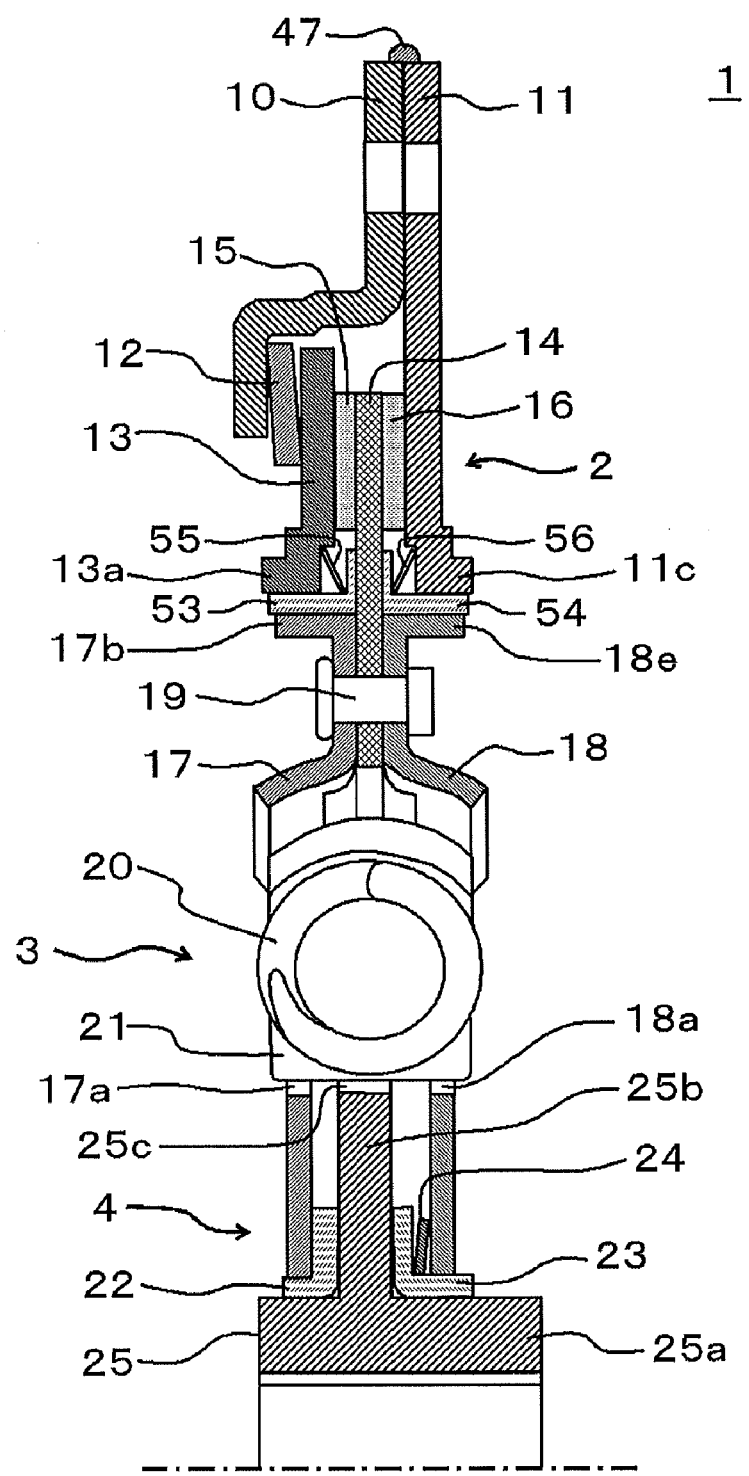
FIG. 14 illustrates a partial cross-section schematically indicating a configuration of a damper device in a fourteenth embodiment.

A damper device of a fourteenth embodiment will be explained with reference to the drawings attached thereto. FIG. 14 illustrates a partial cross section schematically indicating a configuration of a damper device in the fourteenth embodiment.

According to the damper device in the thirteenth embodiment, the thrust member (indicated by the numeral 49 in FIG. 13) functioning as a bearing is positioned between the cover plate (indicated by the numeral 11 in FIG. 13) and the lining plate (indicated by the numeral 14 in FIG. 13), and another thrust member (indicated by the numeral 48 in FIG. 13) functioning also as a bearing is positioned between the pressure plate (indicated by the numeral 13 in FIG. 13) and the lining plate (indicated by the numeral 14 in FIG. 13). According to the damper device 1 in the fourteenth embodiment, a cylindrical portion 13a is formed at the pressure plate 13, and a cylindrical portion 17b is formed at the first side plate 17. In this configuration, a thrust member 53 functioning as a bearing is provided between the cylindrical portions 13a and 17b. Further, a cylindrical portion 11c (e.g., a second stepped portion) is formed at the cover plate 11, and a cylindrical portion 18e is formed at the second side plate 18. In this configuration, a thrust member 54 functioning as a bearing is provided between the cylindrical portions 11c and 18e. The thrust member 53 is biased by means of an elastic body 55 (e.g., a first elastic body) and is press-fitted to the lining plate 14 so as to be relatively rotatable to each other, and the thrust member 54 is biased by means of an elastic body 56 (e.g., a second elastic body) and is press-fitted to the lining plate 14 so as to be relatively rotatable to each other. Other configurations of those members are similar to that in the embodiment 13.

The cylindrical portion 11c is formed at the radially inner end of the cover plate 11, which corresponds to the radially inner portion of the damper device relative to the limiter portion 2 so as to protrude in the axial direction of the damper device 1 toward the side of the transmission (the right side in FIG. 14). The cover plate 11 is arranged in such a way that the cylindrical portion 11c thereof is distant from the cylindrical portion 18e of the second side plate 18. In this configuration, the cover plate 11 is supported by the second side plate 18 (cylindrical portion 18e) at an inner circumferential surface of the cylindrical portion 11c via the thrust member 54 so as to be rotatable relative to each other. The cover plate 11 supports the elastic body 56 in the vicinity of the cylindrical portion 11c. Other configurations of the cover plate 11 are substantially similar to the cover plate (indicated by the numeral 11 in FIG. 1) in the first embodiment.

The cylindrical portion 13a is formed at the radially inner end of the pressure plate 13, which corresponds to the radially inner portion of the damper device relative to the limiter portion 2 so as to protrude in the axial direction of the damper device 1 toward the side of the engine (the left side in FIG. 14). The pressure plate 13 is arranged in such a way that the cylindrical portion 13a thereof is distant from the cylindrical portion 17b of the first side plate 17. In this configuration, the pressure plate 13 is supported by the first side plate 17 (cylindrical portion 17b) at an inner circumferential surface of the cylindrical portion 13a via the thrust member 53 so as to be rotatable relative to each other. The pressure plate 13 supports the elastic body 55 in the vicinity of the cylindrical portion 11c. Other configurations of the pressure plate 13 are substantially similar to the pressure plate (indicated by the numeral 13 in FIG. 1) in the first embodiment.

The cylindrical portion 17b is formed at the radially outer end of the first side plate 17 so as to protrude in the axial direction of the damper device 1 toward the side of the engine (the left side in FIG. 14). The first side plate 17 is arranged in such a way that the cylindrical portion 17b thereof is distant from the cylindrical portion 13a (e.g., a first stepped portion) of the pressure plate 13. In this configuration, the first side plate 17 is supported by the pressure plate 13 (cylindrical portion 13a) at an outer circumferential surface of the cylindrical portion 17b via the thrust member 53 so as to be relatively rotatable to each other. Other configurations of the first side plate 17 are substantially similar to the first side plate (indicated by the numeral 17 in FIG. 1) in the first embodiment.

The cylindrical portion 18e is formed at the radially outer end of the second side plate 18 so as to protrude in the axial direction of the damper device 1 toward the side of the transmission (the right side in FIG. 14). The second side plate 18 is arranged in such a way that the cylindrical portion 18e thereof is distant from the cylindrical portion 11c of the cover plate 11. In this configuration, the second side plate 18 is supported by the cover plate 11 (cylindrical portion 11c) at an outer circumferential surface of the cylindrical portion 18e via the thrust member 54 so as to be relatively rotatable to each other. Other configurations of the second side plate 18 are substantially similar to the second side plate (indicated by the numeral 18 in FIG. 1) in the first embodiment.

The thrust member 53 is formed in an annular shape and is provided between the pressure plate 13 and the first side plate 17. Specifically, the thrust member 53 is arranged in the axial direction of the damper device between the lining plate 14 and the elastic body 55, and the thrust member 53 is biased by means of the elastic body 55 toward the lining plate 14 and is press-fitted to the lining plate 14 so as to be slidable. The thrust member 53 is arranged in a radial direction of the damper device between the pressure plate 13 (cylindrical portion 13a) and the first side plate 17 (cylindrical portion 17b), and the thrust member 53 functions as a bearing for supporting the pressure plate 13 so as to be rotatable relative to the first side plate 17 (cylindrical portion 17b).

The thrust member 54 is formed in an annular shape and is provided between the cover plate 11 and the second side plate 18. Specifically, the thrust member 54 is arranged in the axial direction of the damper device between the lining plate 14 and the elastic body 56, and the thrust member 54 is biased by means of the elastic body 56 toward the lining plate 14 and is press-fitted to the lining plate 14 so as to be slidable. The thrust member 54 is arranged in the radial direction of the damper device between the cover plate 11 (cylindrical portion 11c) and the second side plate 18 (cylindrical portion 18e), and the thrust member 54 functions as a bearing for supporting the cover plate 11 (cylindrical portion 11c) so as to be rotatable relative to the second side plate 18 (cylindrical portion 18e).

The elastic body 55 is positioned between the thrust member 53 and the pressure plate 13 in order to generate a biasing force (elastic force) applied to the thrust member 53 so as to move toward the lining plate 14. The elastic body 55 is made of metal, resin (including a rubber) or a composite body of those materials. A coned disc spring made of metal and covered with resin is an example of the composite body.

The elastic body 56 is positioned between the thrust member 54 and the cover plate 11 in order to generate a biasing force (elastic force) applied to the thrust member 54 so as to move toward the lining plate 14. The elastic body 56 is made of metal, resin (including a rubber) or a composite body of those materials. A coned disc spring made of metal and covered with resin is an example of the composite body.

In the example illustrated in FIG. 14, the thrust member 53 is provided between the pressure plate 13 (cylindrical portion 13a) and the first side plate 17 (cylindrical portion 17b), however, instead of providing the pressure plate 13, the support plate 10 may be formed so as to extend toward the vicinity of the lining plate 14, and a cylindrical portion is formed at a radially inner end portion of the support plate 10. In this configuration, the thrust member 53 may be provided between the modified support plate 10 (cylindrical portion) and the first side plate 17 (cylindrical portion 17b). Further, the thrust member 53 may be biased by means of a coned disc spring so as to be press-fitted to the support plate 10.

According to the fourteenth embodiment, because the clearances of the limiter portion 2 are covered by means of the thrust members 53 and 54, a pathway through which the water enters the damper device may be blocked, as a result, possibility of decrease in performance due to rust or the like may be reduced. Further, in the thirteenth embodiment, the thrust member 53 is press-fitted to the lining plate 14 by means of the elastic body 55, and the thrust member 54 is press-fitted to the lining plate 14 by means of the elastic body 51. Thus, even when the thrust members 53 and 54 are worn relative to the lining plate 14, because each of the thrust members 48 and 49 is press-fitted to the corresponding member, the worn portion may be compensated, and water and the like may not enter the damper device. Accordingly, the waterproof function may be effectively improved. Further, in the thirteenth embodiment, the thrust member 53 is provided between the pressure plate 13 (cylindrical portion 13a) and the first side plate 17 (cylindrical portion 17b), and the thrust member 54 is provided between the cover plate 11 (cylindrical portion 11c) and the second side plate 18 (cylindrical portion 18e). Accordingly, a possibility that the limiter portion 2 becomes eccentric from the hub may be reduced. Furthermore, because the support plate 10 is welded to the cover plate 11 at an outer circumferential surface thereof (welded portion 47), the water may not enter the damper device from the outside of the outer circumferential surface of the damper device.

Figure 15:
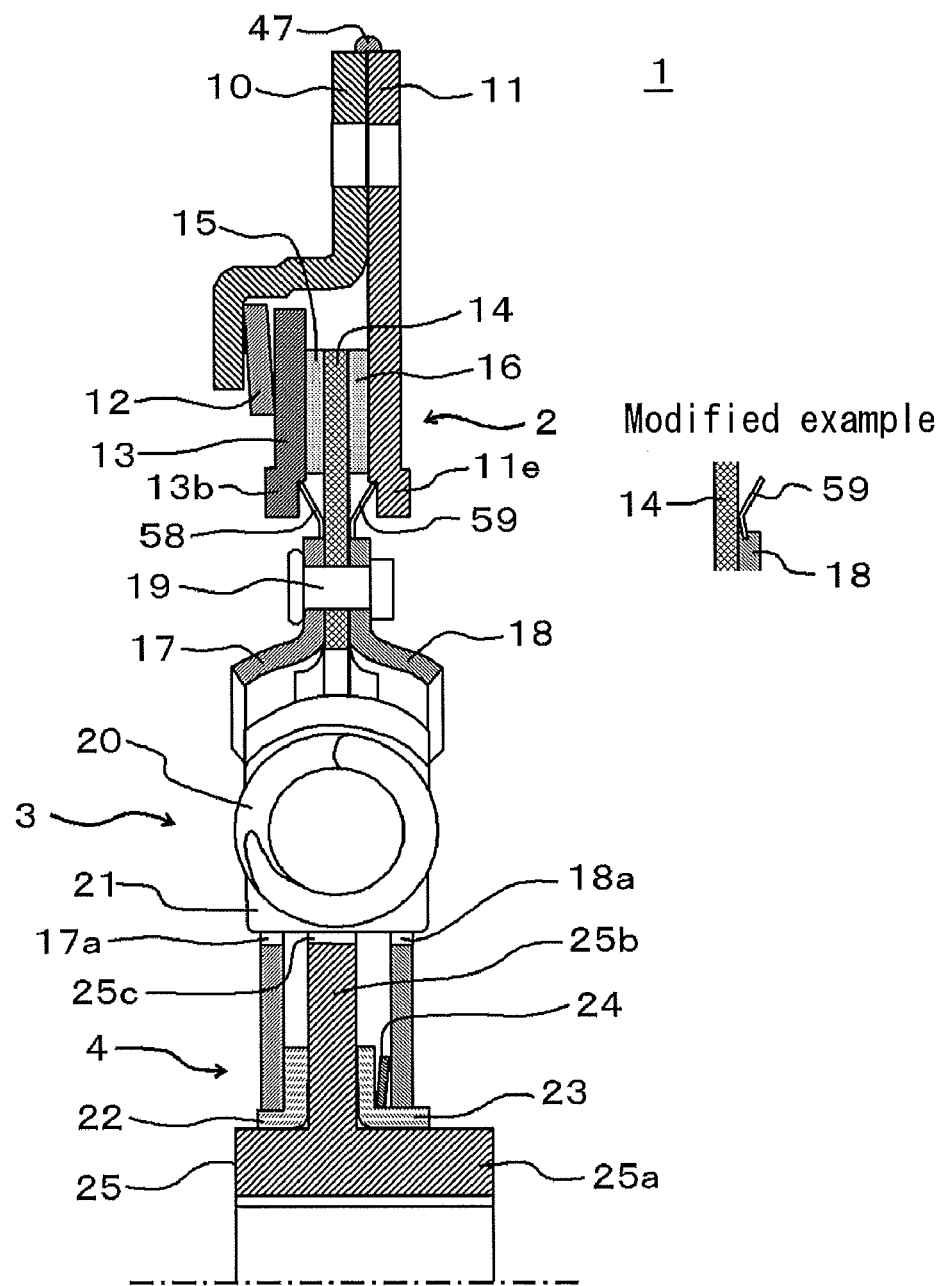
FIG. 15 illustrates a partial cross-section schematically indicating a configuration of a damper device in a fifteenth embodiment.

A damper device of a fifteenth embodiment will be explained with reference to the drawings attached thereto. FIG. 15 illustrates a partial cross section schematically indicating a configuration of a damper device in the fifteenth embodiment.

According to the damper device in the fourteenth embodiment, the cylindrical portions (indicated by the numerals 13a and 17b in FIG. 14) are formed at the pressure plate (indicated by the numeral 13 in FIG. 14) and the first side plate (indicated by the numeral 17 in FIG. 14), and the thrust member (indicated by the numeral 53 in FIG. 14) is positioned between the cylindrical portions (indicated by the numerals 13a and 17b in FIG. 14), and the cylindrical portions (indicated by the numerals 11c and 18e in FIG. 14) are formed at the cover plate (indicated by the numeral 11 in FIG. 14) and the second side plate (indicated by the numeral 18 in FIG. 14), and the thrust member (indicated by the numeral 54 in FIG. 14) is positioned between the cylindrical portions (indicated by the numerals 11c and 18e in FIG. 14). According to the damper device 1 in the fifteenth embodiment, an elastic body 58 (e.g., first elastic body) is provided between the pressure plate 13 (a stepped portion 13b) and the lining plate 14, and an elastic body 59 (e.g., the second elastic body) is provided between the cover plate 11 (a stepped portion 11e) and the lining plate 14. The elastic bodies 58 and 59 are made of metal, resin (including a rubber) or a composite body of those materials. A coned disc spring made of metal and covered with resin is an example of the composite body. Other configurations are similar to that in the fourteenth embodiment.

The stepped portion 11e (e.g., a second stepped portion) is formed at a radially inner portion of the cover plate 11, and the elastic body 59 is deformably supported by the stepped portion 11e. In this configuration, the stepped portion 11e functions for preventing the water entering the limiter portion 2 due to centrifugal forces and for positioning the elastic body 59. Other configurations of the cover plate 11 are substantially similar to the cover plate (indicated by the numeral 11 in FIG. 1) in the first embodiment.

The stepped portion 13b (e.g., a first stepped portion) is formed at a radially inner portion of the pressure plate 13, and the elastic body 58 is deformably supported by the stepped portion 13b. In this configuration, the stepped portion 13b functions for preventing the water entering the limiter portion 2 due to centrifugal forces and for positioning the elastic body 58. Other configurations of the pressure plate 13 are substantially similar to the pressure plate (indicated by the numeral 13 in FIG. 1) in the first embodiment.

The elastic body 58 is positioned between the pressure plate 13 (stepped portion 13b) and the lining plate 14 so as to generate an elastic force. The elastic body 58 is made of metal, resin (including a rubber) or a composite body of those materials. A coned disc spring made of metal and covered with resin is an example of the composite body. The elastic body 58 may be fixed (retained/engaged) to the first side plate 17 in order to prevent a sliding movement relative to the lining plate 14.

The elastic body 59 is positioned between the cover plate 11 (stepped portion 11*e*) and the lining plate 14 in order to generate an elastic force. The elastic body 59 is made of metal, resin (including a rubber) or a composite body of those materials. A coned disc spring made of metal and covered with resin is an example of the composite body. The elastic body 59 may be fixed (retained/engaged) to the second side plate 18 in order to prevent a sliding movement relative to the lining plate 14 as indicated by a modified example illustrated in FIG. 15.

According to the fifteenth embodiment, because the clearances of the limiter portion 2 are covered by means of the elastic bodies 58 and 59, a pathway through which the water enters the damper device may be blocked, as a result, possibility of decrease in performance due to rust or the like may be reduced. Further, the stepped portions 11*e* and 13*b* are formed at the cover plate 11 and the pressure plate 13, and the elastic bodies 58 and 59 are deformably supported by the cover plate 11 and the pressure plate at the stepped portions 11*e* and 13*b*, respectively. Accordingly, the stepped portions 11*e* and 13*b* may effectively prevent the water entering the limiter portion 2 due to centrifugal forces. Furthermore, because the support plate 10 is welded to the cover plate 11 at an outer circumferential surface thereof (welded portion 47), the water may not enter the damper device from the outside of the outer circumferential surface of the damper device.

Figure 16:
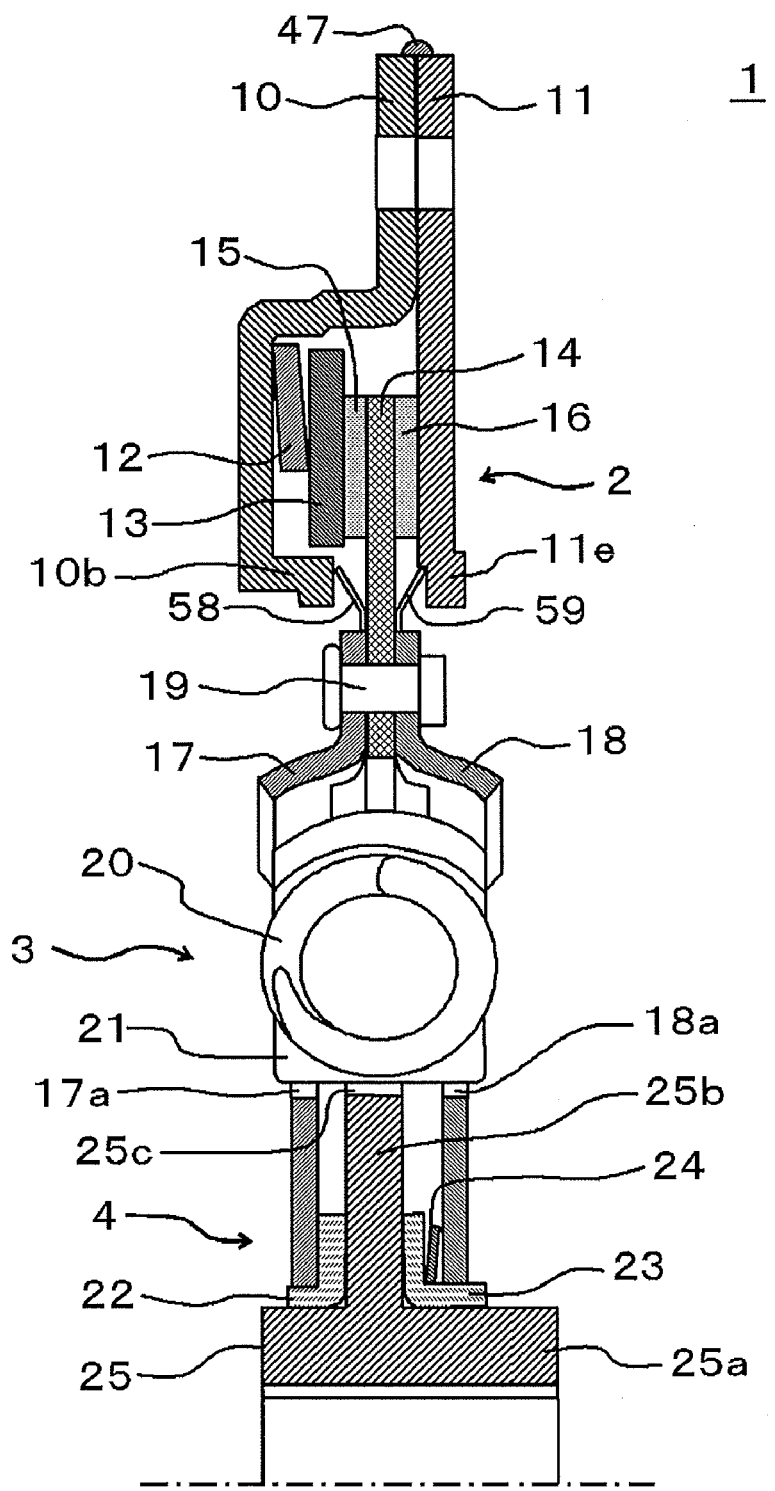
FIG. 16 illustrates a partial cross-section schematically indicating a configuration of a damper device in a sixteenth embodiment.

A damper device of a sixteenth embodiment will be explained with reference to the drawings attached thereto. FIG. 16 illustrates a partial cross section schematically indicating a configuration of a damper device in the sixteenth embodiment.

According to the damper device in the fifteenth embodiment, the elastic body (indicated by the numeral 58 in FIG. 15) is positioned between the pressure plate (indicated by the numeral 13 in FIG. 15; the stepped portion 13*b*) and the lining plate (indicated by the numeral 14 in FIG. 15).

According to the damper device 1 in the sixteenth embodiment 16, the support plate 10 includes an extending portion 10*b* (e.g., first stepped portion) formed at a radially inner portion of the support plate 10, and the elastic body 58 is positioned between the extending portion 10*b* of the support plate 10 and the lining plate 14. Specifically, the extending portion 10*b* is formed at the radially inner portion of the support plate 10 so as to extend toward the vicinity of the lining plate 14, and the elastic body 58 is supported by the support plate 10 at the extending portion 10*b*. Other configurations of the damper device are substantially similar to those in the fifteenth embodiment.

According to the damper device in the sixteenth embodiment, results and effects substantially similar to the damper device in the fifteenth embodiment may be obtained.

Figure 17:
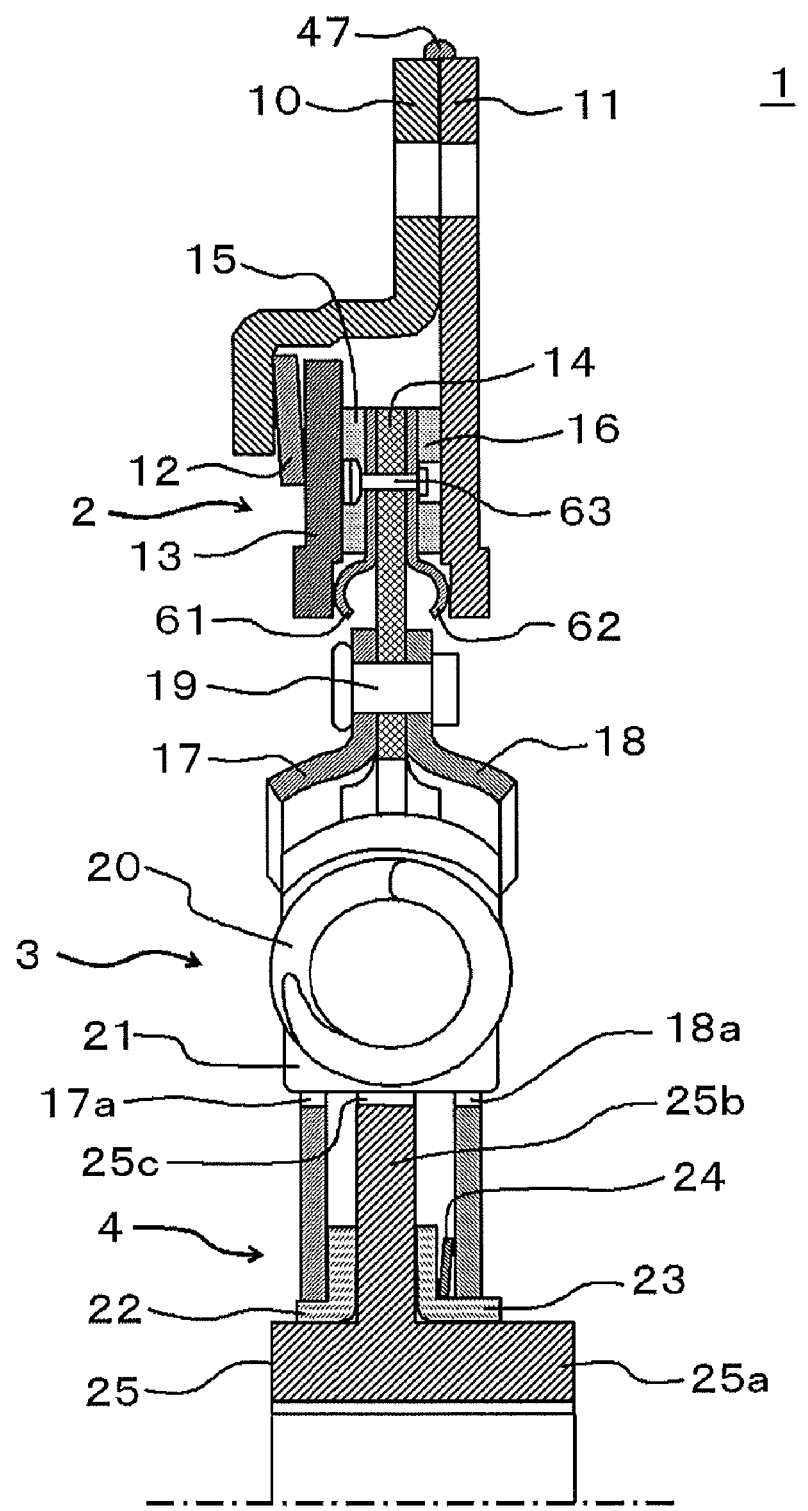
FIG. 17 illustrates a partial cross-section schematically indicating a configuration of a damper device in a seventeenth embodiment.

A damper device of a seventeenth embodiment will be explained with reference to the drawings attached thereto. FIG. 17 illustrates a partial cross section schematically indicating a configuration of a damper device in the seventeenth embodiment.

According to the modified example of the damper device in the fifteenth embodiment, the elastic bodies (indicated by the numerals 58 and 59 in FIG. 15) are fixed at the side plates (indicated by the numerals 17 and 18 in FIG. 15), respectively. According to the damper device 1 in the seventeenth embodiment, an elastic body 61 is provided between the friction material 15 and the lining plate 14, and an elastic body 62 is provided between the friction material 16 and the lining plate 14. In this configuration, the elastic bodies 61 and 61, the friction materials 15 and 16 and the lining plate 14 are fixed together so as to be integral by means of a rivet 63. The elastic body 61 is press-fitted to the pressure plate 13, and the elastic body 62 is press-fitted to the cover plate 11. The elastic bodies 61 and 62 are made of metal, resin (including a rubber) or a composite body of those materials. A coned disc spring made of metal and covered with resin is an example of the composite body. Other configurations are similar to that in the fifteenth embodiment.

In the drawing of FIG. 17, the elastic body 61 is press-fitted to the pressure plate 13, however, the support plate 10 may be formed so as to extend toward the vicinity of the lining plate 14, and the elastic body 61 may be press-fitted to the support plate 10. Further, in the drawing of FIG. 17, the elastic body 61 is press-fitted to the pressure plate 13 at the surface thereof facing the lining plate 14, and the elastic body 62 is press-fitted to the cover plate 11 at the surface facing the lining plate 14, however, the elastic body 61 may be press-fitted to the pressure plate 13 at the other surface not facing the lining plate 14, and the elastic body 62 may be press-fitted to the cover plate 11 at the other surface not facing the lining plate 14.

According to the seventeenth embodiment, because the clearances of the limiter portion 2 are covered by means of the elastic bodies 61 and 62, a pathway through which the water enters the damper device may be blocked, as a result, possibility of decrease in performance due to rust or the like may be reduced. Further, because the elastic bodies 61 and 62 are fixed to the friction materials 15 and 16 and the lining plate 14 so as to be integral therewith by means of the rivet 63, the number of parts that constitute the damper device may be decreased, as a result, the mountability of the damper device may be improved. Furthermore, because the support plate 10 is welded to the cover plate 11 at an outer circumferential surface thereof (welded portion 47), the water may not enter the damper device from the outside of the outer circumferential surface of the damper device.

Figure 18:
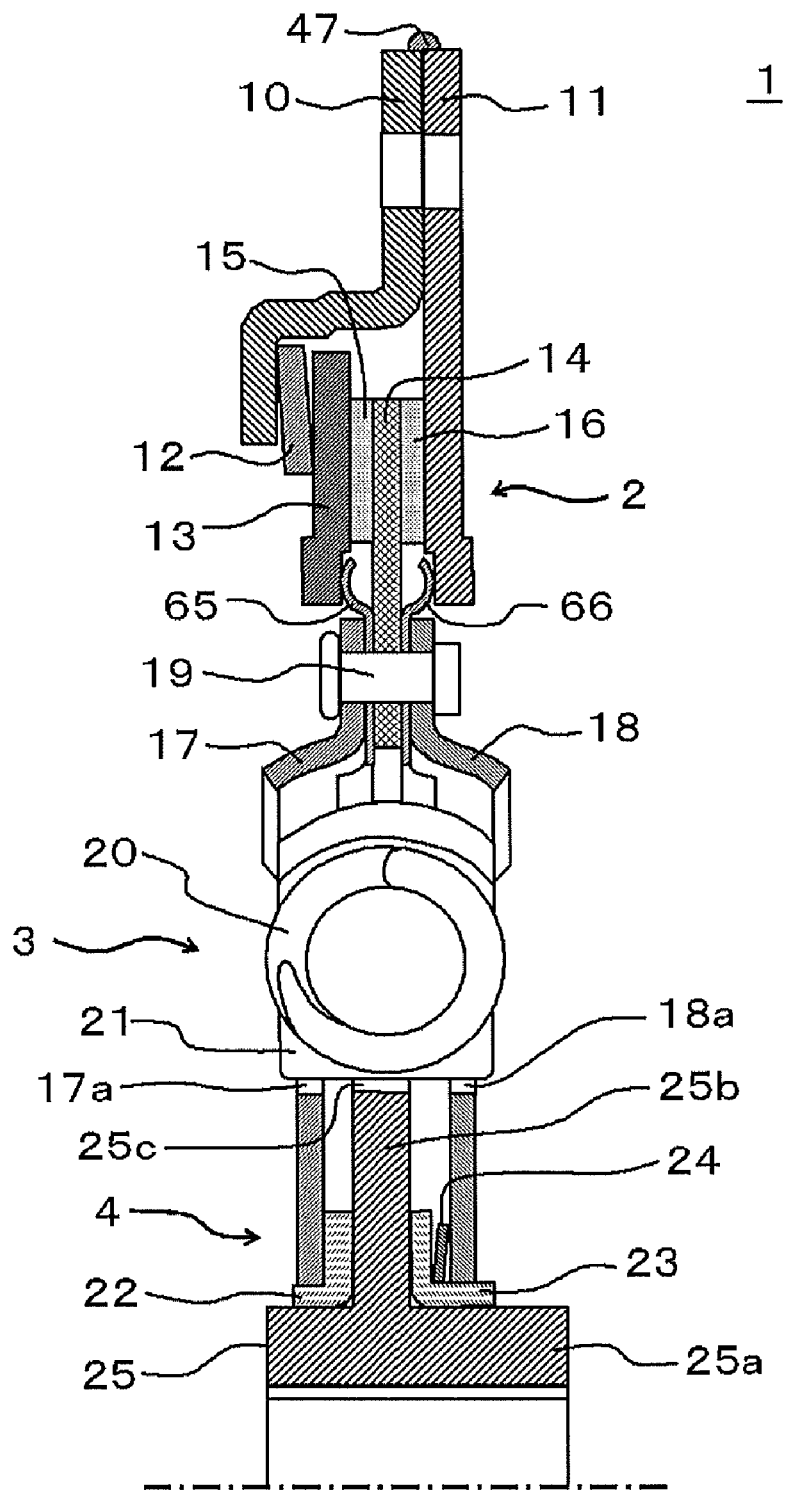
FIG. 18 illustrates a partial cross-section schematically indicating a configuration of a damper device in a eighteenth embodiment.

A damper device of an eighteenth embodiment will be explained with reference to the drawings attached thereto. FIG. 18 illustrates a partial cross section schematically indicating a configuration of a damper device in the eighteenth embodiment.

According to the damper device in the seventeenth embodiment, the elastic body (indicated by the numeral 61 in FIG. 17) is positioned between the friction material (indicated by the numeral 15 in FIG. 17) and the lining plate (indicated by the numeral 14 in FIG. 17), and the elastic body (indicated by the numeral 62 in FIG. 17) is positioned between the friction material (indicated by the numeral 16 in FIG. 17) and the lining plate (indicated by the numeral 14 in FIG. 17), and those parts are tightened by means of the rivet (indicated by the numeral 63 in FIG. 17) so as to be integral. According to the damper device 1 in the eighteenth embodiment, an elastic body 65 is provided between the first side plate 17 and the lining plate 14, and an elastic body 66 is provided between the second side plate 18 and the lining plate 14, and the elastic bodies 65 and 66, the first and second side plates 17 and 18 and the lining plate 14 are tightened together by means of a rivet 19 so as to be integral. In this configuration, the elastic body 65 is press-fitted to the pressure plate 13, and the elastic body 66 is press-fitted to the cover plate 11. The elastic bodies 65 and 66 are made of metal, resin (including a rubber) or a composite body of those materials. A coned disc spring made of metal and covered with resin is an example of the composite body. Other configurations are similar to that in the seventeenth embodiment.

In the example of the drawing of FIG. 18, the elastic body 65 is press-fitted to the pressure plate 13, however, instead of providing the elastic body 65, the support plate 10 may be formed so as to extend toward the vicinity of the lining plate 14, and the elastic body 65 may be press-fitted to the support plate 10. Further, in the example of the drawing of FIG. 18, the elastic body 65 is press-fitted to the pressure plate 13 at the surface thereof facing the lining plate 14, and the elastic body 66 is press-fitted to the cover plate 11 at the surface thereof facing the lining plate 14. However, the elastic body 65 may be press-fitted to the pressure plate 13 at the opposite surface not facing the lining plate 14, and the elastic body 66 may be press-fitted to the cover plate 11 at the opposite surface not facing the lining plate 14.

According to the eighteenth embodiment, because the clearances of the limiter portion 2 are covered by means of the elastic bodies 65 and 66, a pathway through which the water enters the damper device may be blocked, as a result, possibility of decrease in performance due to rust or the like may be reduced. Further, the elastic bodies 65 and 66 are fixed to the first and second side plates 17 and 18 and the lining plate 14 so as to be integral therewith by means of the rivet 19, the number of parts that constitute the damper device may be decreased, as a result, the mountability of the damper device may be improved. Furthermore, because the support plate 10 is welded to the cover plate 11 at an outer circumferential surface thereof (welded portion 47), the water may not enter the damper device from the outside of the outer circumferential surface of the damper device.

A damper device of a nineteenth embodiment will be explained with reference to the drawings attached thereto. FIG. 19 illustrates a partial cross section schematically indicating a configuration of a damper device in the nineteenth embodiment.

According to the damper device in the fifteenth embodiment, the elastic body (indicated by the numeral 58 in FIG. 15) is positioned between the pressure plate (indicated by the numeral 13 in FIG. 15; a stepped portion 13b) and the lining plate (indicated by the numeral 14 in FIG. 15), and the elastic body (indicated by the numeral 59) is positioned between the cover plate (indicated by the numeral 11 in FIG. 15; a stepped portion 11e) and the lining plate (indicated by the numeral 14 in FIG. 15). According to the damper device 1 in the nineteenth embodiment, a resin 68 is provided between the pressure plate 13 and the lining plate 14, and a resin 69 is provided between the cover plate 11 and the lining plate 14. The resin 68 may be provided integrally with or independently from the pressure plate 13 and/or the lining plate 14. The resin 69 may be provided integrally with or independently from the cover plate 11 and/or the lining plate 14.

According to the nineteenth embodiment, because the clearances of the limiter portion 2 are covered by means of the resin 68 and 69, a pathway through which the water enters the damper device may be blocked, as a result, possibility of decrease in performance due to rust or the like may be reduced. Further, because the support plate 10 is welded to the cover plate 11 at an outer circumferential surface thereof (welded portion 47), the water may not enter the damper device from the outside of the outer circumferential surface of the damper device.

The damper device of a twentieth embodiment will be explained with reference to the drawings attached thereto. FIG. 20 illustrates partial cross sections schematically indicating four examples of sealing manner in the damper device of the twentieth embodiment.

According to the damper device in each of the thirteenth to nineteenth embodiments, the support plate 10 and the cover plate 11 are welded together at the outer circumferential surfaces thereof (the welded portion 47) as indicated in the drawing of FIG. 20A. In addition to this configuration, in each of the thirteenth to nineteenth embodiments, as illustrated in the drawing of FIG. 20B, the limiter portion (the support plate 10 and the cover plate 11) may be fixed to the flywheel 5 in such a way that a seal member 71 is provided between the flywheel 5 and the support plate 10 at a surface facing the flywheel 5, and the support plate 10 and the cover plate 11 are fixed to the flywheel 5 by means of the bolt 45. Further, as illustrated in the drawing of FIG. 20C, the support plate 10 and the cover plate 11 are fixed together by the seal member 73 provided therebetween and tightened by means of a rivet. Furthermore, as illustrated in the drawing of FIG. 20D, a seal member 72 is fixed to the cover plate 11 (may be fixed to the pressure plate 13 or the support plate 10) at a radially inner end portion thereof, and a projecting portion of the seal member 72 is press-fitted to the second side plate 18 (may be press-fitted to the lining plate 14) at a surface facing the transmission (a right surface in FIG. 20D).

According to the twentieth embodiment, because the clearances of the limiter portion 2 are covered by means of the seal members 71, 72 and 73, a pathway, through which the water enters the damper device, may be blocked, as a result, possibility of decrease in performance due to rust or the like may be reduced.

Figure 21:
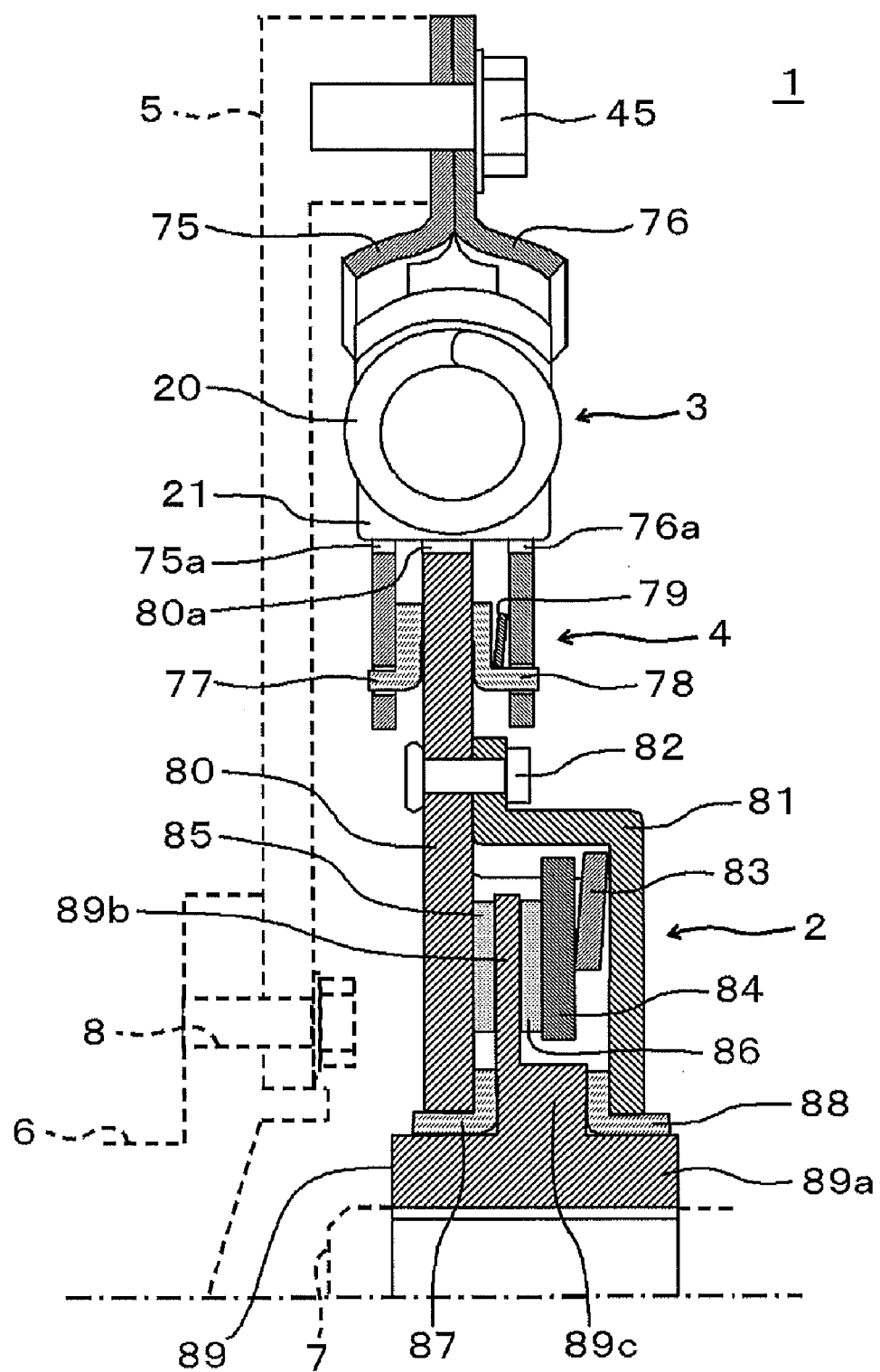
FIG. 21 illustrates a partial cross-section schematically indicating a configuration of a damper device in a twenty-first embodiment.

A damper device of a twenty-first embodiment will be explained with reference to the drawings attached thereto. FIG. 21 illustrates a partial cross section schematically indicating a configuration of a damper device in the twenty-first embodiment.

According to the damper device in the first embodiment, the limiter portion 2 is arranged at the radially outer portion of the damper device relative to the damper portion 3, however; according to the damper device in the twenty-first embodiment, the limiter portion 2 is arranged at the radially inner portion of the damper device relative to the damper portion 3.

The damper device 1 in the twenty-first embodiment includes side plates 75 and 76, thrust members 77 and 78, a coned disc spring 79, a cover plate 80, a support plate 81, a rivet 82, a coned disc spring 83, a pressure plate 84, friction materials 85 and 86 (e.g., first and second friction materials), a thrust member 87 (e.g., a second intermediate member) and a thrust member 88 (e.g., a first intermediate member), and a hub member 89.

The side plate 75 is formed in a circular shape and positioned at the engine side of the cover plate 80 (at the left of the cover plate 80 in FIG. 21). The side plate 75 constitutes the damper portion 3 and the hysteresis portion 4. The side plate 75 contacts the side plate 76 at the radially outer portion thereof, and the side plates 75 and 76 are fixed to the flywheel 5 at the radially outer portion thereof so as to be integral by means of a bolt 45. At an intermediate portion of the side plate 75, which corresponds to the damper portion 3, a window portion 75a is formed in order to house the coil spring 20 and the seat members 21 (first and second seat members 21). Specifically, one end surface of the window portion 75a in a circumferential direction contacts the first seat member 21 so as to be detachable, and the other end surface of the window portion 75a in a circumferential direction contacts the second seat member 21 so as to be detachable. At the hysteresis portion 4 set at a radially inner portion relative to the damper portion 3, the side plate 75 is arranged so as to be movable relative to the thrust member 77 in the axial direction of the damper device and not to be relatively rotatable with the thrust member 77.

The side plate 76 is formed in a circular shape and is positioned at the transmission side of the cover plate 80 (at the right of the cover plate 80 in FIG. 21). The side plate 76 also constitutes the damper portion 3 and the hysteresis portion 4. The side plate 76 contacts the side plate 75 at the radially outer portion thereof, and the side plates 75 and 76 are fixed to the flywheel 5 at the radially outer portion thereof so as to be integral by means of the bolt 45. At an intermediate portion of the side plate 76, which corresponds to the damper portion 3, a window portion 76a is formed in order to house the coil spring 20 and the seat members 21 (first and second seat members 21). Specifically, one end surface of the window portion 76a in a circumferential direction contacts the first seat member 21 so as to be detachable, and the other end surface of the window portion 76a in a circumferential direction contacts the second seat member 21 so as to be detachable. At the hysteresis portion 4 set at the radially inner portion of the damper device relative to the damper portion 3, the side plate 76 supports the coned disc spring 79 and is arranged so as to be movable relative to the thrust member 78 in the axial direction of the damper device and not to be rotatable relative to the thrust member 78.

The thrust member 77 constituting the hysteresis portion 4 is formed in an annular shape and is provided between the side plate 75 and the cover plate 80. The thrust member 77 is movable relative to the side plate 75 in the axial direction of the damper device and is not rotatable relative to the side plate 75, and the thrust member 77 is press-fitted to the cover plate 80 so as to be slidable.

The thrust member 78 constituting the hysteresis portion 4 is formed in an annular shape and is provided between the coned disc spring 79 and the cover plate 80. The thrust member 78 is movable relative to the side plate 76 in the axial direction of the damper device and is not rotatable relative to the side plate 76, and the thrust member 78 is biased toward the cover plate 80 by means of the coned disc spring 79 and is press-fitted to the cover plate 80 so as to be slidable.

The coned disc spring 79 constitutes the hysteresis portion 4. The coned disc spring 79 is formed in a plate shape and is provided between the thrust member 78 and the side plate 76 in order to bias the thrust member 78 toward the cover plate 80.

The cover plate 80 is formed in a circular shape and is provided between the side plates 75 and 76 in such a way that the side plates 75 and 76 are arranged so as to be distant from the cover plate 80. The cover plate 80 constitutes the limiter portion 2, the damper portion 3 and the hysteresis portion 4. The cover plate 80 includes a window portion 80a at a radially outer portion thereof, which corresponds to the damper portion 3, in order to house the coil spring 20 and the seat members 21 (first and second seat members 21). Specifically, one end surface of the window portion 80a in a circumferential direction contacts the first seat member 21 so as to be detachable, and the other end surface of the window portion 80a in a circumferential direction contacts the second seat member 21 so as to be detachable. The cover plate 80 is supported by the thrust members 77 and 78 so as to be slidable at surfaces facing an axial direction of the hysteresis portion 4, which is set at the radially inner portion of the damper device relative to the damper portion 3. The cover plate 80 contacts a radially outer portion of the support plate 81, which corresponds to the limiter portion 2 set at the radially inner portion of the damper device relative to the hysteresis portion 4, and the cover plate 80 and support plate 81 are fixed together so as to be integral by means of a rivet 82. The cover plate 80 is slidably fit to the friction material 85 at a sliding surface corresponding to the limiter portion 2. The cover plate 80 is supported at a radially inner end thereof by the hub member 89 (hub portion 89a) so as to be relatively rotatable thereto via a thrust member 87 in such a way that the cover plate 80 contacts at a surface thereof facing the spacer portion 89c to the thrust member 87 so at to be slidable.

The support plate 81 is formed in an annular shape and is positioned at the transmission side of the cover plate 80 (at the right of the cover plate 80 in FIG. 21). The support plate 80 constitutes the limiter portion 2. The support plate 81 is fixed to the cover plate 80 at the radially outer portion thereof, and the support plate 81 and the cover plate 80 are integrally fixed together at the radially outer portion thereof by means of the rivet 82. The support plate 81 is arranged so as to be distant from the cover plate 80 at the radially inner portion thereof. The support plate 81 supports the pressure plate 84 and the coned disc spring 83 so as not to be rotatable relative to each other and so as to be movable in the axial direction of the damper device. The support plate 81 is press-fitted to the coned disc spring 83. The support plate 81 is supported by the hub member 89 (hub portion 89a) via the thrust member 88 so as to be relatively rotatable to the hub member 89. The support plate 81 contacts the thrust member 88 at surfaces of the support plate 81 facing the spacer portion 89c so as to be slidable.

The rivet 82 functions as a fixing member for fixing the support plate 81 to the cover plate 80 so as to be integral.

The coned disc spring 83 is formed in a plate shape and is provided between the support plate 81 and the pressure plate 84. The coned disc spring 83 constitutes the limiter potion 2. The coned disc spring 83 biases the pressure plate 84 toward the friction material 86. The coned disc spring 83 is supported by the support plate 81 so as to be movable in the axial direction of the damper device and not to be rotatable relative to the support plate 81.

The pressure plate 84 is formed in an annular shape and is provided between the coned disc spring 83 and the friction material 86. The pressure plate 84 constitutes the limiter portion 2. The pressure plate 84 is supported by the support plate 81 so as to move in the axial direction of the damper device and not to be rotatable relative to the support plate 81. The pressure plate 84 is biased by the coned disc spring 83 toward the friction material 86 and is press-fitted to the friction material 86 at a sliding surface so as to be slidable.

The friction material 85 constitutes the limiter portion 2 and is provided between the flange portion 89b and the cover plate 80. The friction material 85 is fixed to the flange portion 89b by means of a rivet, an adhesive agent or the like. The friction material 85 is press-fitted to the cover plate 80 so as to be slidable.

The friction material 86 constitutes the limiter portion 2 and is provided between the flange portion 89b and the pressure plate 84. The friction material 86 is fixed to the flange portion 89b by means of a rivet, an adhesive agent or the like. The friction material 86 is press-fitted to the pressure plate 84 so as to be slidable.

The thrust member 87 is formed in an annular shape and is provided between the cover plate 80 and the hub member 89 (hub portion 89a). Specifically, the thrust member 87 is positioned between the cover plate 80 and the spacer portion 89c in the axial direction of the damper device in such a way that the thrust member 87 contacts the cover plate 80 and the spacer portion 89c so as to be slidable. The thrust member 87 is also positioned between the cover plate 80 and the hub portion 89*a* in the radial direction of the damper device. The thrust member 87 functions as a plain bearing (bush) for supporting the cover plate 80 to the hub portion 89*a* so as to be relatively rotatable.

The thrust member 88 is formed in an annular shape and is provided between the support plate 81 and the hub member 89 (hub portion 89*a*). Specifically, the thrust member 88 is positioned between the support plate 81 and the spacer portion 89*c* in the axial direction of the damper device in such a way that the thrust member 88 contacts the support plate 81 and the spacer portion 89*c* so as to be slidable. The thrust member 88 is also positioned between the support plate 81 and the hub portion 89*a* in the radial direction of the damper device. The thrust member 88 functions as a plain bearing (bush) for supporting the support plate 81 to the hub portion 89*a* so as to be relatively rotatable.

The hub member 89 functions as a member for outputting the rotational torque of the engine transmitted from the limiter portion 2 to the transmission. The hub member 89 constitutes the limiter portion 2. The hub member 89 includes the spacer portions 89 on an outer circumferential surface of the hub portion 89*a* and also includes a flange portion 98*b* formed so as to extend in a radial direction of the hub member 89 on an outer circumferential surface of the spacer portion 89*c*. The spacer portion 89*c* may not be formed at the hub portion 89*a*, and the flange portion 89*b* may be directly formed on the outer circumferential surface of the hub portion 89*a* in the radial direction of the hub portion 89*a*. A plurality of spline is formed on an inner circumferential surface of the hub portion 89*a* so that the rotational shaft (the rotational shaft of the transmission 7) is connected to the hub member 89. The hub portion 98*a* supports the cover plate 80 at the outer circumferential surface of the hub portion 98*a* via the thrust member 87 so as to be rotatable relative to the cover plate 80. The hub portion 89*a* also supports the support plate 81 via the thrust member 88 so as to be rotatable relative to the support plate 81. The spacer portion 89*c* is formed in order to secure a space between the hub member 89 and the thrust members 87 and 88 in the axial direction of the damper device. The spacer portion 89*c* contacts each of the thrust members 87 and 88 so as to be slidable. The flange portion 89*b* is formed for supporting the friction materials 85 and 86 at a position between the cover plate 80 and the pressure plate 81. The friction materials 85 and 86 are fixed to the flange portion 89*b* by means of a rivet, an adhesive agent or the like.

According to the twenty-first embodiment, because the clearances of the limiter portion 2 are covered by means of the thrust members 87 and 88, a pathway through which the water enters the damper device may be blocked, as a result, possibility of decrease in performance due to rust or the like may be reduced. Further, because the thrust member 87 is positioned between the cover plate 80 and the hub member 89 (hub portion 89*a*), and because the thrust member 88 is positioned between the support plate 81 and the hub member 89 (hub portion 89*a*), a possibility that the water enters the limiter portion of the damper device 1 may be reduced, also a possibility that the limiter portion 2 becomes eccentric from the hub may be reduced. Furthermore, because the thrust member 87 is positioned between the cover plate 80 and the spacer portion 89*c* in the axial direction of the damper device, and because the thrust member 88 is positioned between the support plate 81 and the spacer portion 89*c* in the axial direction of the damper device, the cover plate 80 may contact the thrust member 87 at a relatively large area and may also contact the thrust member 88 at a relatively large area, accordingly the water proof function may be improved.

Figure 20C:
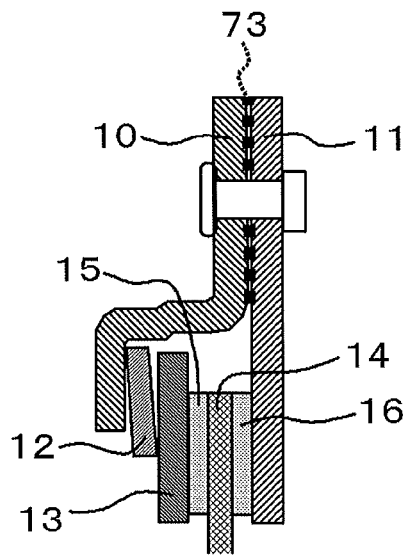
Figure 20D:
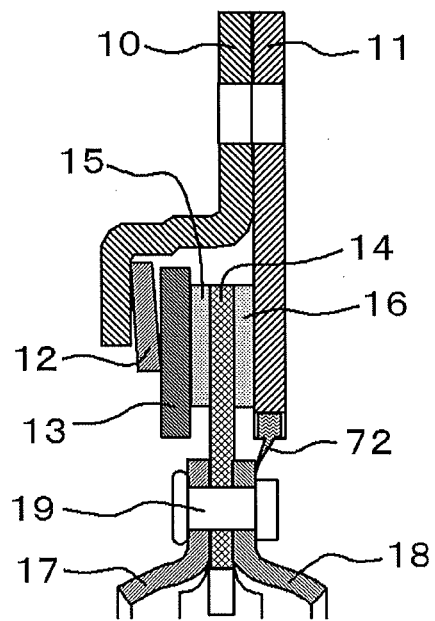

The configurations indicated in the drawings of FIG. 20A through FIG. 20*c* may be applied to the damper device of the twenty-first embodiment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper device comprising:
a damper portion for absorbing a torsion by use of an elastic force; and
a limiter portion generating a slide when the torsion is not absorbed by the damper portion, and
the limiter portion including:
a first constitutive member formed so as to cover at least one of the damper portion and the limiter portion;
a first friction material fixed to one surface of a second constitutive member of the damper portion;
a second friction material fixed to the other surface of the second constitutive member of the damper portion;
a cover plate provided so as to be slidable to the first friction material, the cover plate being a single plate;
a support plate arranged so as to be distant from the cover plate at a radially inner portion of the support plate and so as to contact the cover plate at a radially outer portion of the support plate;
a pressure plate provided so as to be slidable to the second friction material;
a coned disc spring provided between the support plate and the pressure plate in order to bias the pressure plate toward the second friction material, wherein the first constitutive member is at least one of the cover plate and the support plate; and
wherein the limiter portion is set so as to be further outward than the damper portion in a radial direction of the damper device, and the first constitutive member includes a radially inner portion extending so as to be further inward than a sliding surface of the limiter portion in the radial direction of the damper device, and the damper portion is covered by the radially inner portion of the first constitutive member.

2. The damper device according to claim 1, wherein the damper portion includes:
a hub member having a flange portion formed so as to extend from a predetermined portion of an outer circumferential surface of a hub portion formed in a cylindrical shape;
a first side plate provided so as to face one surface of the flange portion so as to be distant therefrom;
a second side plate provided so as to face the other surface of the flange portion so as to be distant therefrom;
a coil spring for absorbing a torsion generated between the flange portion and each of the first and second side plates by use of an elastic force, wherein the second constitutive member is a lining plate fixed to the first and second side plates; and
an intermediate member functioning as a plain bearing, and the intermediate member positioned between the radially inner portion of the first constitutive member and the hub portion in the radial direction of the damper device.

3. The damper device according to claim 1, wherein the damper portion includes:
   a hub member having a flange portion formed so as to extend from a predetermined portion of an outer circumferential surface of a hub portion formed in a cylindrical shape;
   a first side plate provided so as to face one surface of the flange portion so as to be distant therefrom;
   a second side plate provided so as to face the other surface of the flange portion so as to be distant therefrom; and
   a coil spring for absorbing a torsion generated between the flange portion and each of the first and second side plates by use of an elastic force, wherein the second constitutive member is a lining plate fixed to the first and second side plates, and the damper device further comprises:
   a first intermediate member positioned between the radially inner portion of the first constitutive member and the hub portion in a radial direction of the damper device, the first intermediate member functioning as a plain bearing;
   a second intermediate member positioned between at least one of the first and the second side plates and the hub portion in the radial direction of the damper device, the second intermediate member functioning as a plain bearing; and
   an elastic body positioned between the second side plate and the second intermediate member in an axial direction of the damper device.

4. The damper device according to claim 1, wherein the damper portion includes:
   a hub member having a flange portion formed so as to extend from a predetermined portion of an outer circumferential surface of a hub portion formed in a cylindrical shape;
   a first side plate provided so as to face one surface of the flange portion so as to be distant therefrom;
   a second side plate provided so as to face the other surface of the flange portion so as to be distant therefrom; and
   a coil spring for absorbing a torsion generated between the flange portion and each of the first and second side plates by use of an elastic force, wherein the second constitutive member is a lining plate fixed to the first and second side plates, the hub portion includes a stepped portion on an outer circumferential surface of the hub portion, a first intermediate member positioned between the radially inner portion of the first constitutive member and the stepped portion in a radial direction of the damper device, the first intermediate member functioning as a plain bearing and a second intermediate member positioned between at least one of the first and the second side plates and the hub portion in the radial direction of the damper device, the second intermediate member functioning as a plain bearing, and wherein the radially inner portion of the first constitutive member applies a biasing force toward the flange portion, and the first intermediate member is also positioned between the radially inner portion of the first constitutive member and a surface of the stepped portion facing an axial direction of the damper device so as to be press-fitted to the surface of the stepped portion by use of the biasing force of the radially inner portion.

5. The damper device according to claim 1, wherein the radially inner portion is formed in such a way that a thickness of a outer portion of the radially inner portion is set so as to be different from that of an inner portion of the radially inner portion, and the thickness of the inner portion of the radially inner portion is set to be equal to or more than 20% but equal to or less than 80% of the thickness of the outer portion of the radially inner portion.

6. The damper device according to claim 1, wherein at least one of the first and second side plates is formed so as to cover the limiter portion.

7. The damper device according to claim 6, wherein the damper portion includes:
   a hub member having a flange portion formed so as to extend from a predetermined portion of an outer circumferential surface of a hub portion formed in a cylindrical shape;
   a first side plate provided so as to face one surface of the flange portion so as to be distant therefrom;
   a second side plate provided so as to face the other surface of the flange portion so as to be distant therefrom; and
   a coil spring for absorbing a torsion generated between the flange portion and each of the first and second side plates by use of an elastic force, wherein the at least one of the first and second side plates covers a part of the first constitutive member of the limiter portion.

8. The damper device according to claim 1, further comprising a hub portion that includes a hub portion, and wherein an inner portion of the cover plate is supported by the hub portion.

* * * * *